United States Patent
Okabe et al.

(10) Patent No.: US 10,128,960 B2
(45) Date of Patent: Nov. 13, 2018

(54) ESTIMATION METHOD FOR OPTICAL RECEIVER AND LIGHT SOURCE DEVICE

(71) Applicant: FUJITSU LIMITED, Kawasaki-shi, Kanagawa (JP)

(72) Inventors: Ryou Okabe, Shinagawa (JP); Toshiki Tanaka, Setagaya (JP); Tomoo Takahara, Kawasaki (JP); Masato Nishihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/407,063

(22) Filed: Jan. 16, 2017

(65) Prior Publication Data

US 2017/0230120 A1 Aug. 10, 2017

(30) Foreign Application Priority Data

Feb. 4, 2016 (JP) .................................. 2016-019770

(51) Int. Cl.
| | |
|---|---|
| *H04B 10/516* | (2013.01) |
| *H04B 10/61* | (2013.01) |
| *H04B 10/079* | (2013.01) |
| *H04B 10/077* | (2013.01) |

(52) U.S. Cl.
CPC ..... *H04B 10/6165* (2013.01); *H04B 10/0779* (2013.01); *H04B 10/0795* (2013.01); *H04B 10/07955* (2013.01)

(58) Field of Classification Search
CPC ..... H04B 10/07; H04B 10/5165; H04B 10/60
See application file for complete search history.

(56) References Cited

U.S. PATENT DOCUMENTS

| 9,746,699 B2 * | 8/2017 | Kato ................. G02F 1/011 |
| 2002/0171900 A1 * | 11/2002 | Ono ................. H04B 10/505 |
| | | 398/183 |
| 2015/0280830 A1 * | 10/2015 | Hwang .......... H04B 10/5165 |
| | | 398/147 |

OTHER PUBLICATIONS

Lian Zhao et al., "10G Linear TIA in Long-reach Multi-mode Applications", (inphi corp), (http://www.mpdigest.com/issue/Articles/2008/Japan/inphi/) (9 pages).

(Continued)

*Primary Examiner* — Shi K Li
(74) *Attorney, Agent, or Firm* — Fujitsu Patent Center

(57) ABSTRACT

A method for estimating characteristics of an optical receiver includes: a generating process, a monitoring process, a suppressing process, a guiding process and an estimating process. The generating process generates a modulated optical signal based on an oscillation signal. The monitoring process monitors an optical spectrum of the modulated optical signal or a spectrum of an electric signal obtained by performing optical-to-electrical conversion on the modulated optical signal. The suppressing process suppresses a modulation component of an upper sideband or a lower sideband of the modulated optical signal based on the optical spectrum of the modulated optical signal or the spectrum of the electric signal. The guiding process guides the modulated optical signal in which the modulation component is suppressed to the optical receiver. The estimating process estimates the characteristics of the optical receiver based on an output signal of the optical receiver.

8 Claims, 25 Drawing Sheets

(56) References Cited

OTHER PUBLICATIONS

David Lewis et al., "400G DMT PMD for 2km SMF" (JDSU), (May 14, 2014) (23 pages).
Francois Tremblay, "PAM-8 and PAM-16 Optical Receivers for 2km 100G Links with a 4dB loss budget", (http://www.ieee802.org/3/100GNGOPTX/public/mar12/plenary/), (Mar. 10, 2012) (18 pages).

* cited by examiner

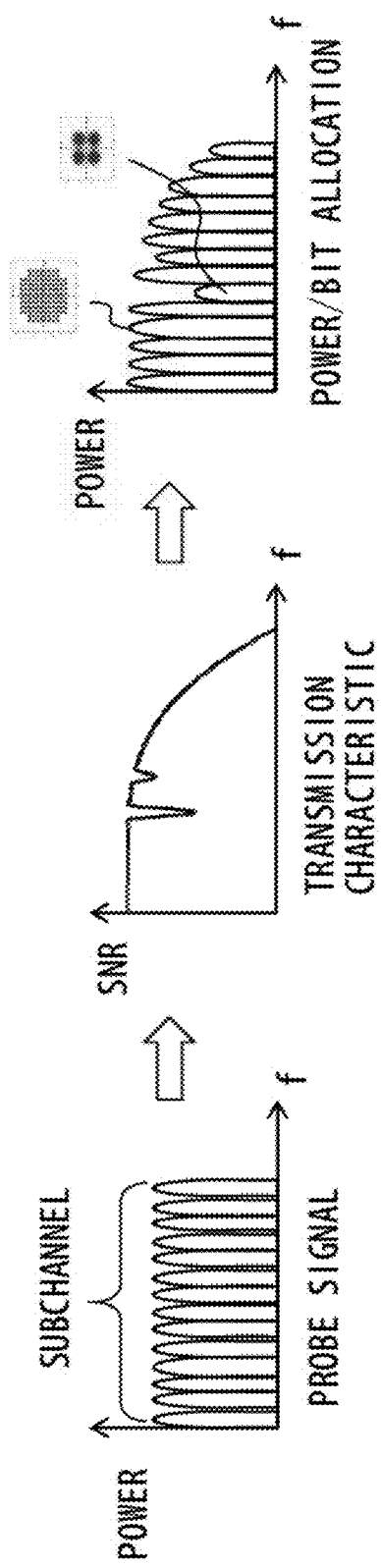
F I G. 3

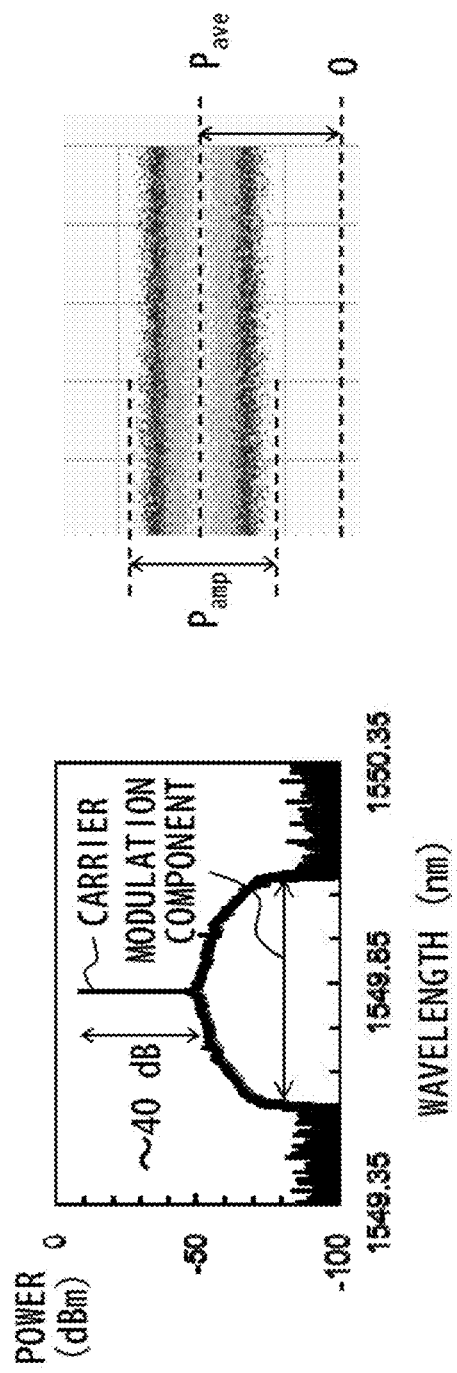

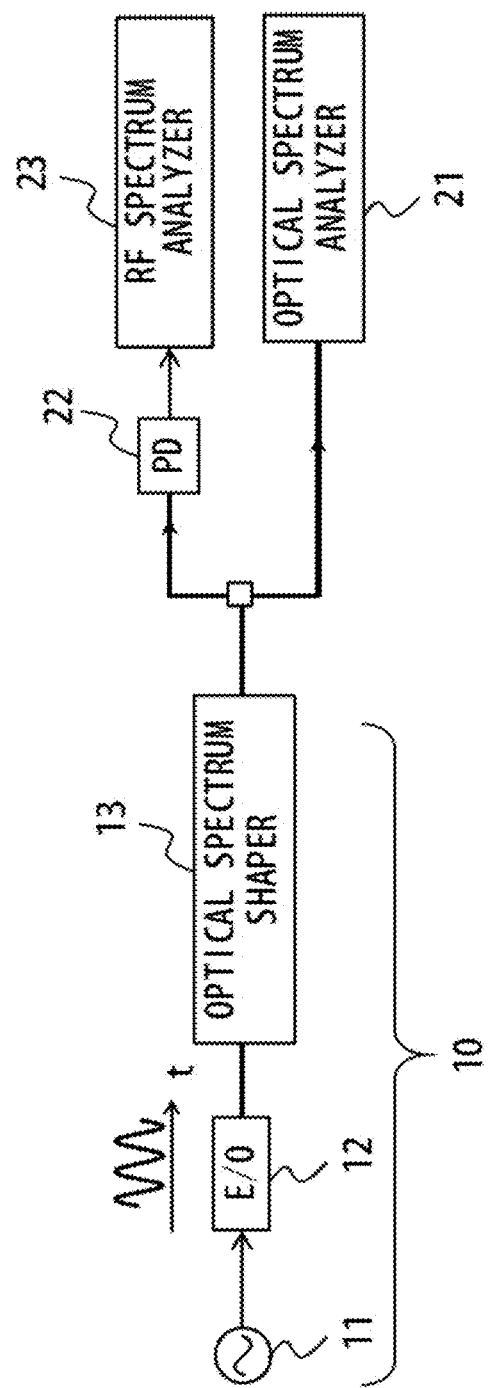
F I G. 6

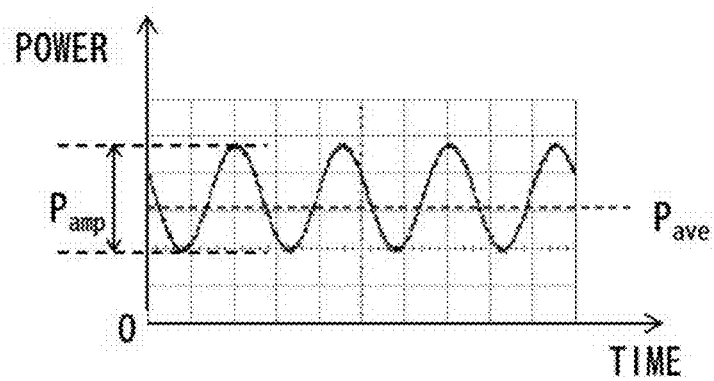
F I G. 9

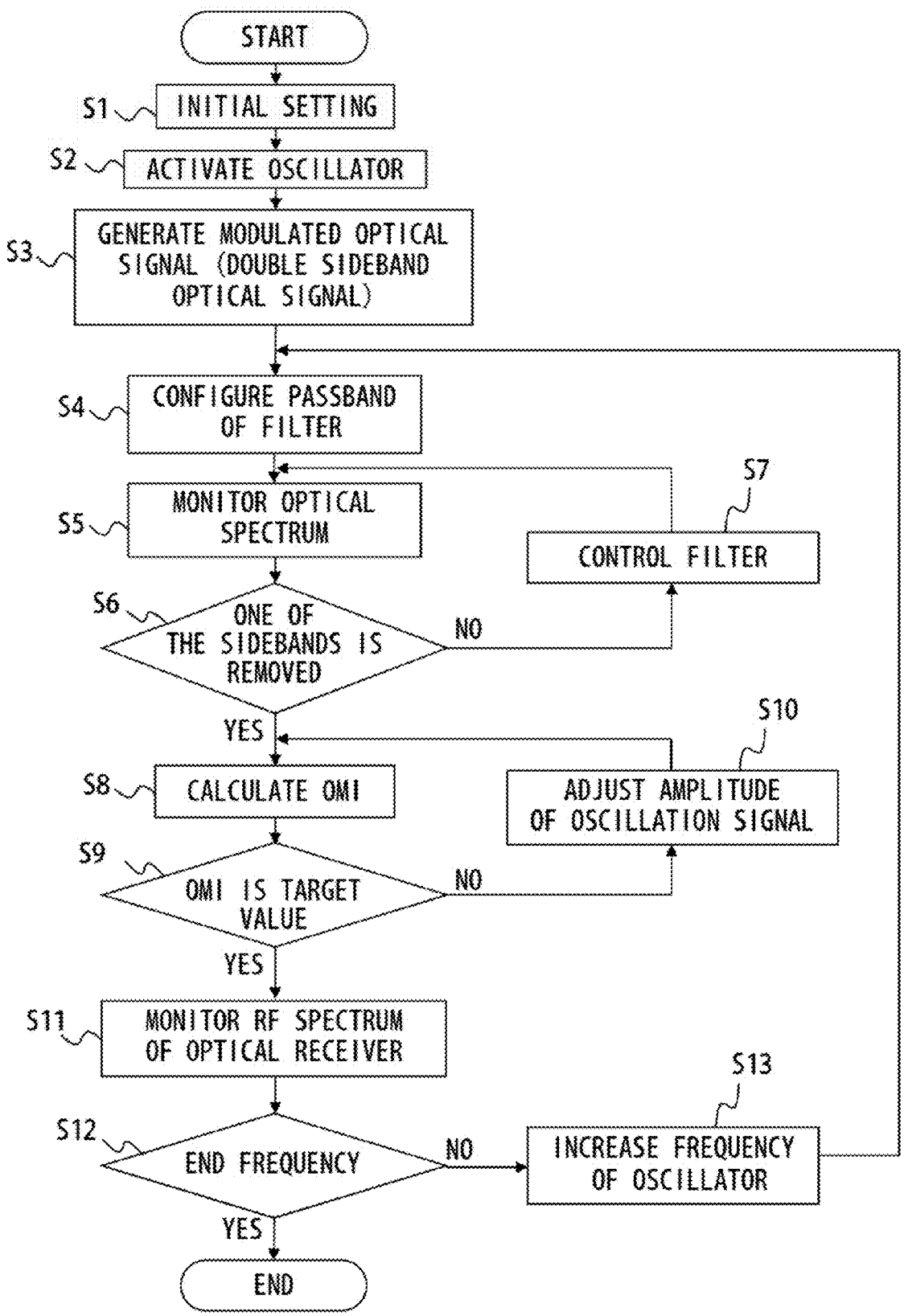
F I G. 10

F I G. 11A
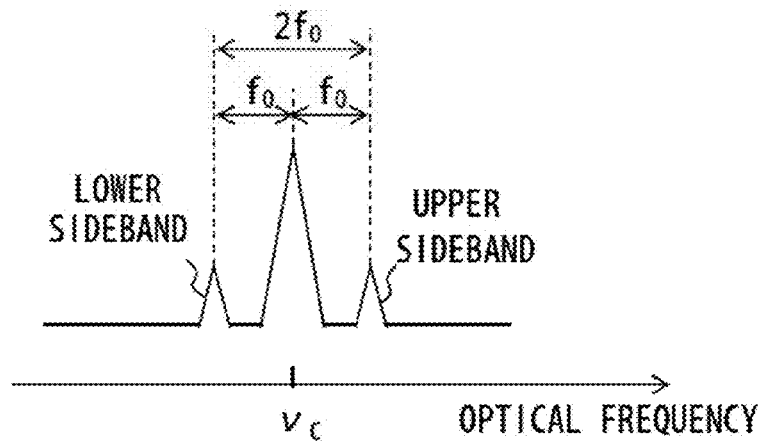
F I G. 11B
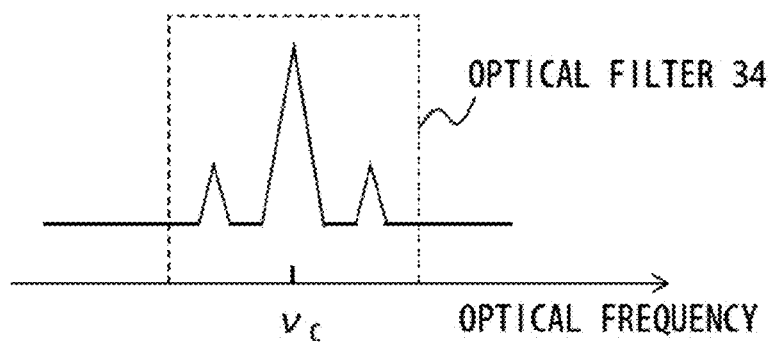
F I G. 11C
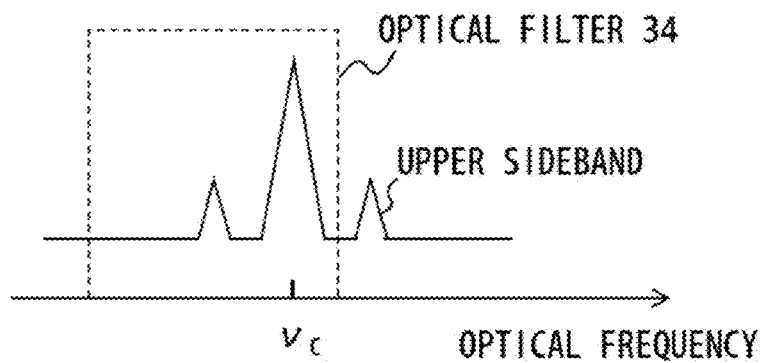

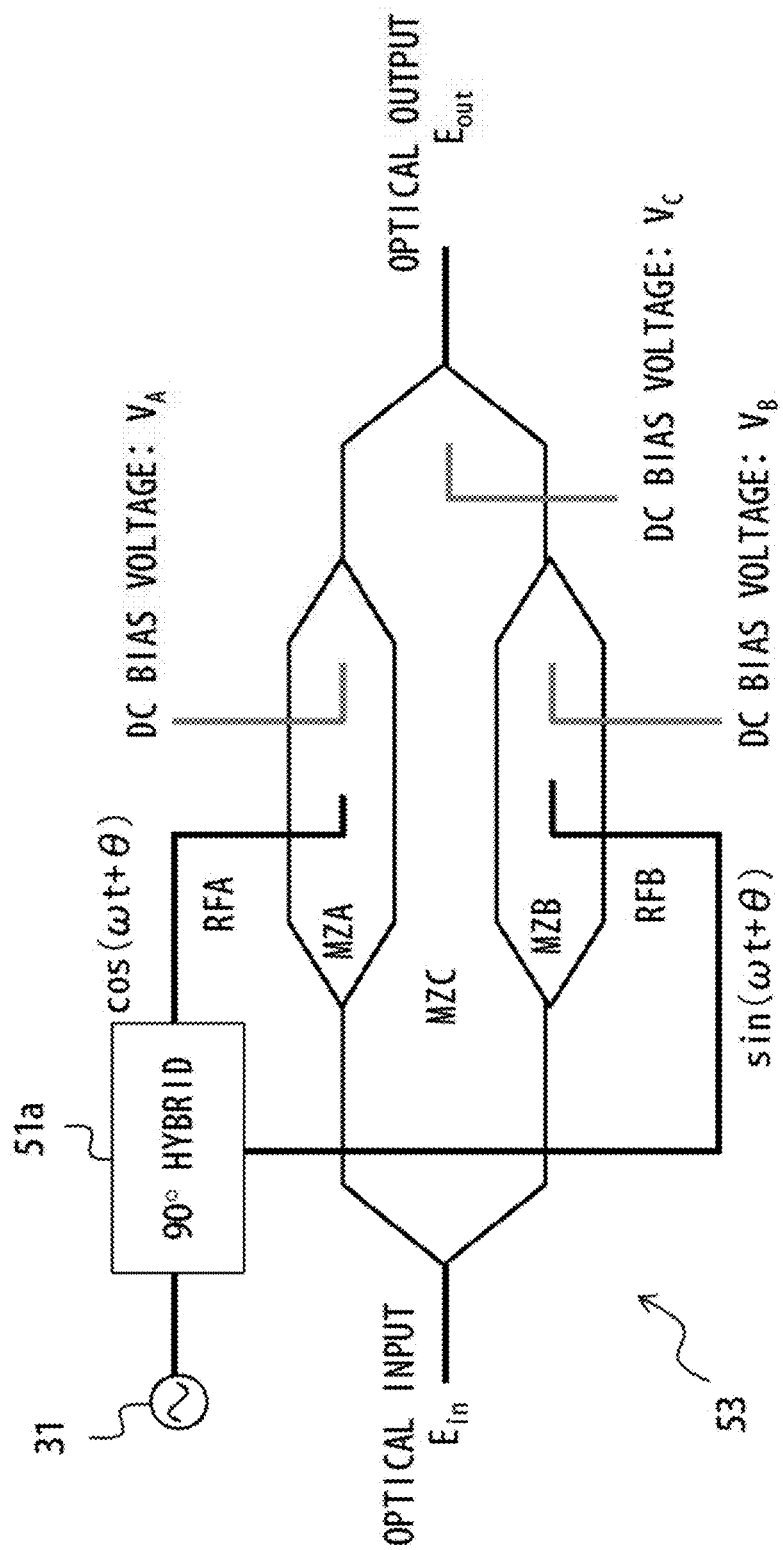
F I G. 14

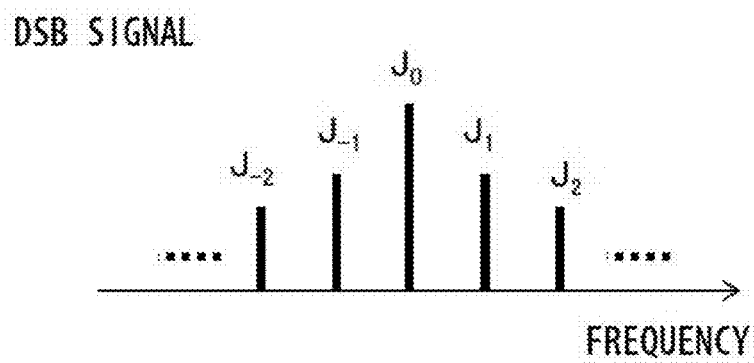
F I G. 1 5 A
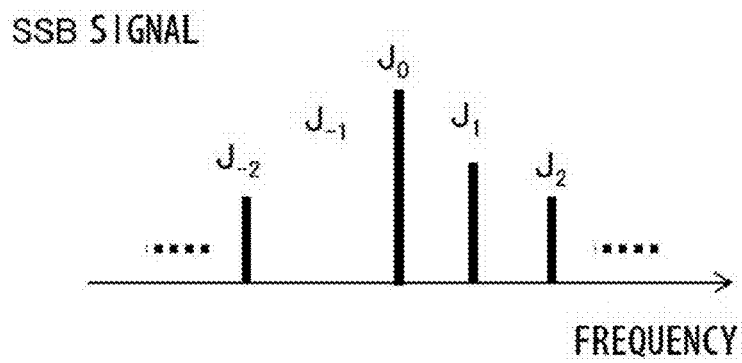
F I G. 1 5 B

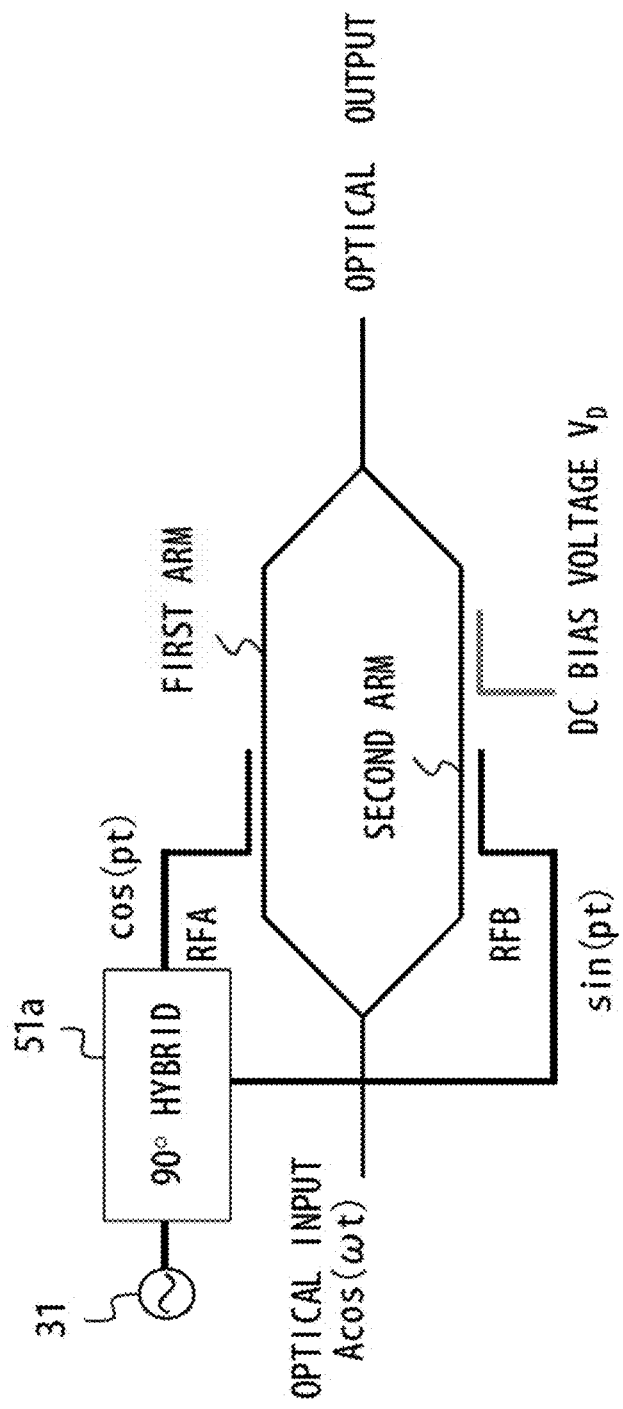
F I G. 17

F I G. 18A
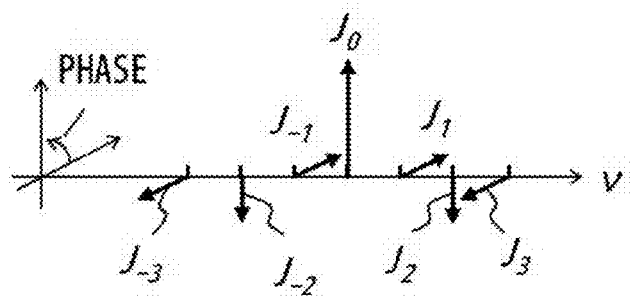
F I G. 18B
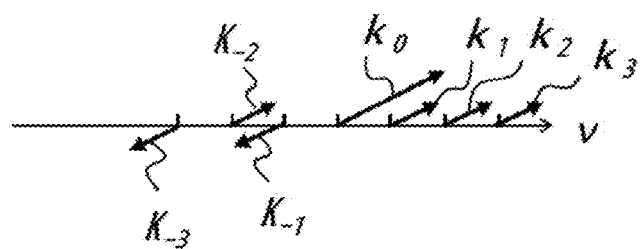
F I G. 18C
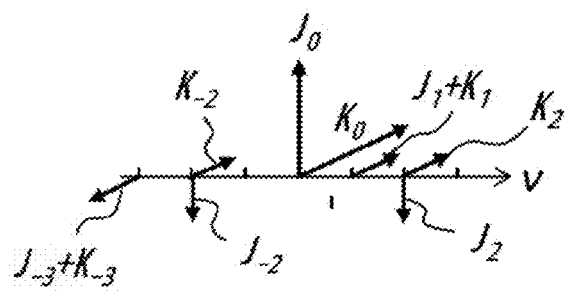

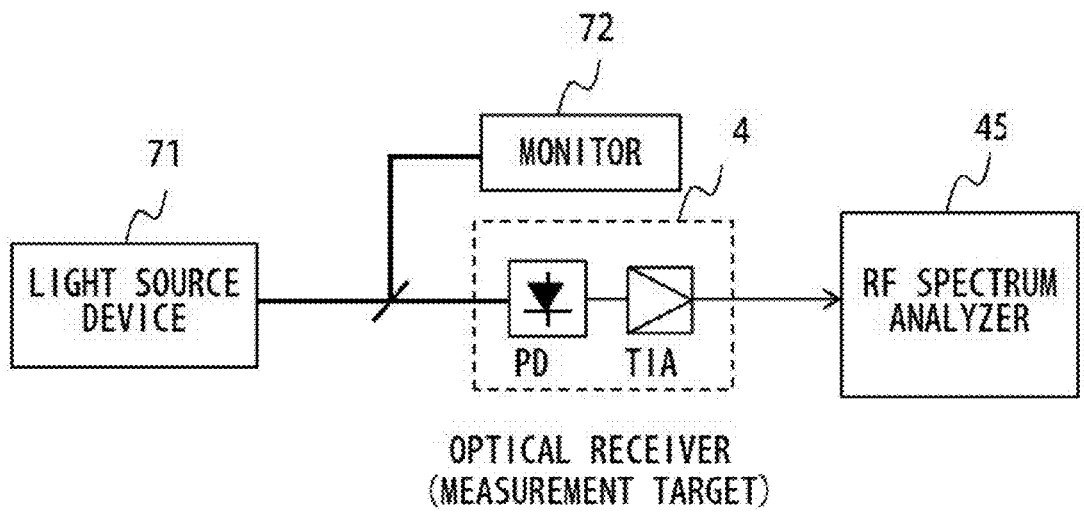
F I G. 19

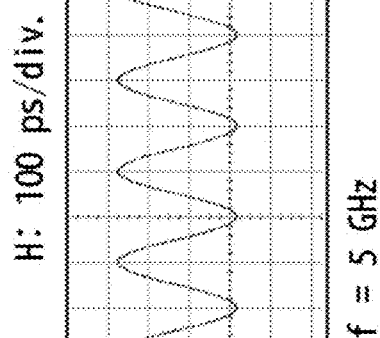
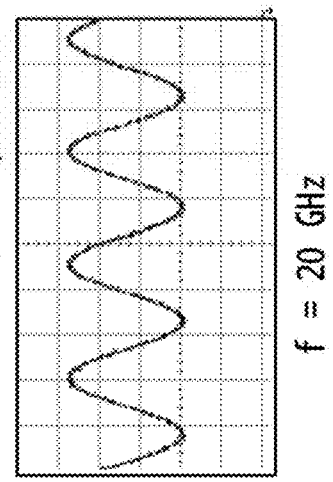
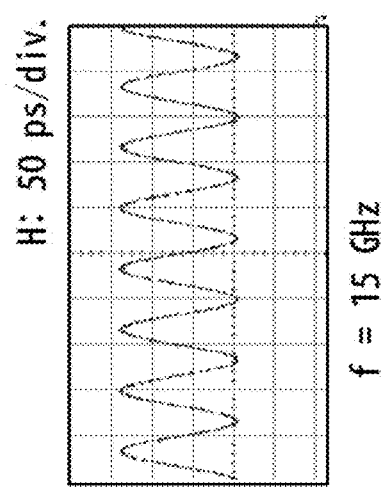
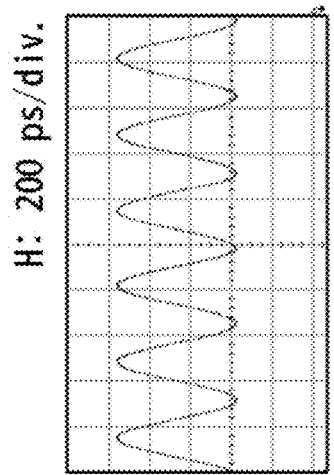
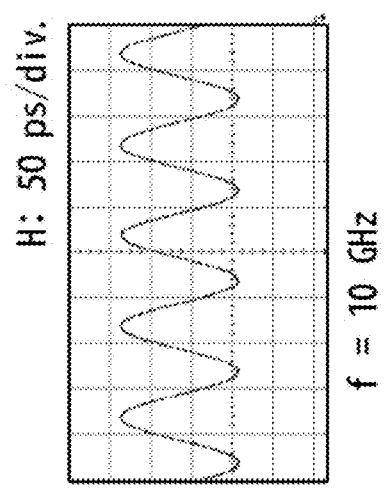
FIG. 22

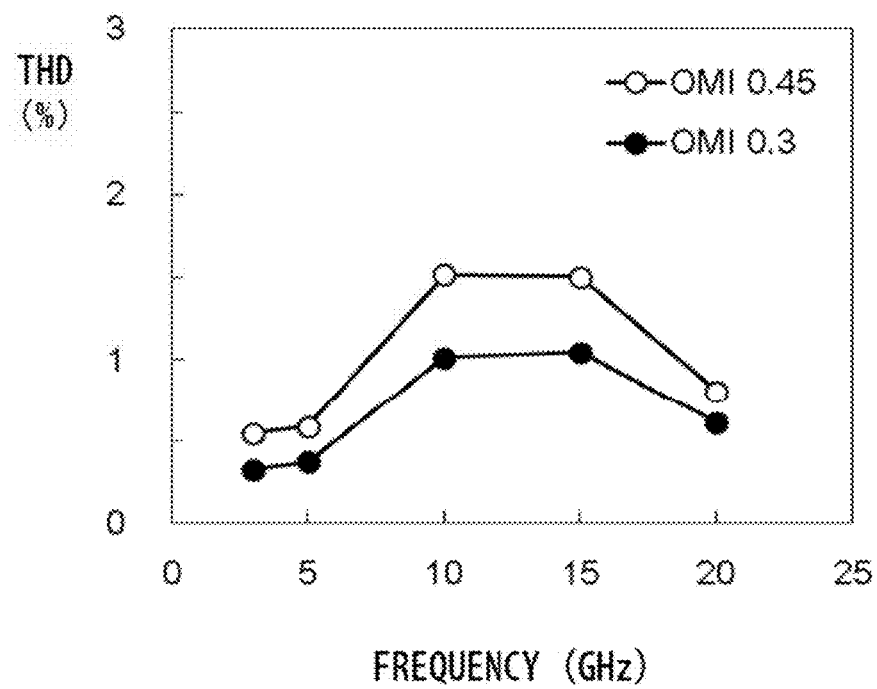
F I G. 23

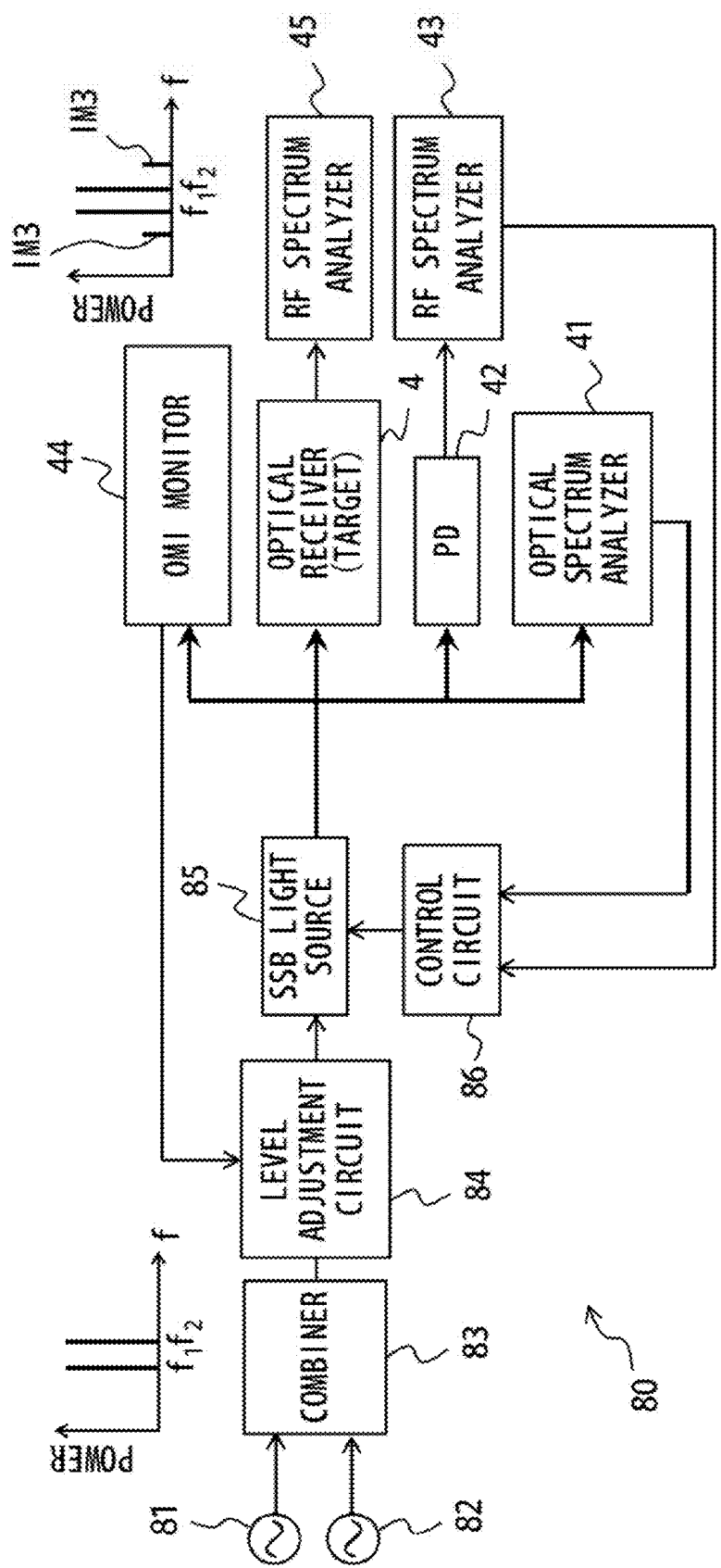
F I G. 24

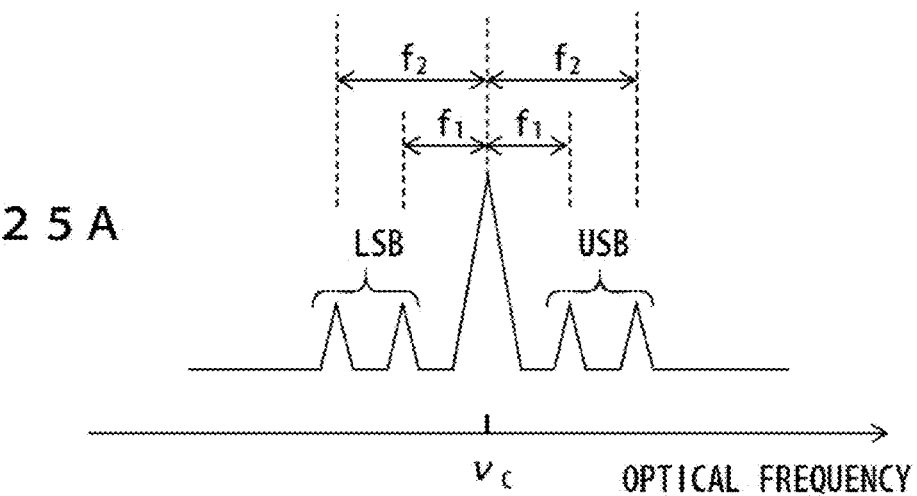
F I G. 2 5 A
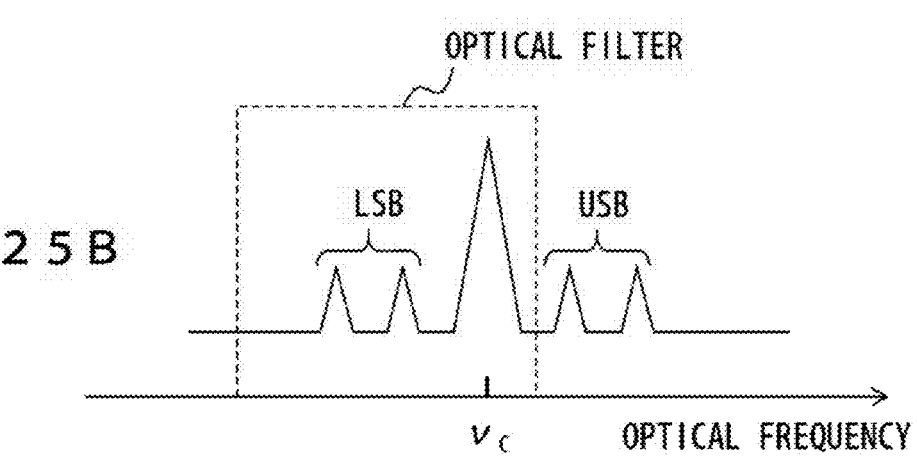
F I G. 2 5 B

ESTIMATION METHOD FOR OPTICAL RECEIVER AND LIGHT SOURCE DEVICE

CROSS-REFERENCE TO RELATED APPLICATION

This application is based upon and claims the benefit of priority of the prior Japanese Patent Application No. 2016-019770, filed on Feb. 4, 2016, the entire contents of which are incorporated herein by reference.

FIELD

The embodiments discussed herein are related to a method for estimating an optical receiver and a light source device used in estimation for the optical receiver.

BACKGROUND

In an optical transmission system, total harmonics distortion (THD) is one factor of deterioration of a signal-to-noise ratio (SNR). The total harmonics distortion indicates a ratio of a harmonics component to a fundamental wave component. Namely, the total harmonics distortion THD is expressed according to formula (1).

$$THD = \sqrt{\frac{\sum_1^n P_n}{P_0}} \times 100 \quad (1)$$

$P_0$ indicates the power of a fundamental wave. $P_n$ (n=1, 2, ...) indicates the power of each harmonics.

FIG. 1 illustrates an example of an optical transmission system. The optical transmission system includes a modulation circuit 1, an optical transmitter 2, an optical transmission link 3, an optical receiver 4, and a demodulation circuit 5. In this example, the optical transmission system transmits an optical discrete multi-tone (DMT) signal. Accordingly, the modulation circuit 1 includes a DMT modulator and a digital-to-analog (D/A) converter. The optical transmitter 2 includes a driver and a light source circuit (LD). The driver generates a drive signal from an output signal of the modulation circuit 1. The light source circuit generates an optical DMT signal based on the drive signal. The optical DMT signal is transmitted to the optical receiver 4 via the optical transmission link 3. The optical receiver 4 includes a photo detector (PD) and an amplifier (TIA). The photo detector performs optical-to-electrical conversion so as to convert the optical DMT signal into an electric signal. The amplifier amplifies the electric signal that is output from the photo detector. Alternatively, the amplifier converts a current signal that is output from the photo detector into a voltage signal. The demodulation circuit 5 includes an analog-to-digital (A/D) converter and a DMT demodulator. Total harmonics distortion may be generated in the optical transmitter 2 and the optical receiver 4.

In the optical transmission system, the total harmonics distortion needs to be estimated accurately in order to improve the quality (for example, an SNR) of a received signal. In the configuration illustrated in FIG. 1, it is preferable that the total harmonics distortion be estimated in each of the optical transmitter 2 and the optical receiver 4.

FIG. 2 illustrates an example of a method for estimating total harmonics distortion generated in the optical receiver 4. In the example illustrated in FIG. 2, a total harmonics distortion estimator includes an oscillator 11, an electrical-to-optical (E/O) circuit 12, and an RF spectrum analyzer 20. The oscillator 11 oscillates at a frequency that corresponds to a given control signal, and generates a sine wave signal. Namely, the oscillator 11 generates a sine wave signal having a frequency that corresponds to the control signal. The E/O circuit 12 generates an optical sine wave based on the sine wave signal that is output from the oscillator 11. As an example, the E/O circuit 12 modulates carrier light by using the sine wave signal so as to generate an optical sine wave. The optical sine wave is used to estimate total harmonics distortion of an estimation target. Accordingly, in the example illustrated in FIG. 2, the optical sine wave is input into the optical receiver 4. The RF spectrum analyzer 20 detects a spectrum of an electric signal that is output from the optical receiver 4. In the example illustrated in FIG. 2, a fundamental wave component $f_0$ and its harmonics components $f_1$ and $f_2$ are detected. $f_0$ corresponds to an oscillation frequency of the oscillator 11.

Total harmonics distortion is calculated according to the formula (1). Accordingly, frequency dependency of the total harmonics distortion generated in the optical receiver 4 can be obtained by sweeping the oscillation frequency of the oscillator 11.

A method for measuring total harmonics distortion generated in an optical receiver is described, for example in Document 1. In addition, the specification of a request relating to total harmonics distortion of a component that configures a DMT transmission system is described, for example, in Document 2. Further, influence of total harmonics distortion on signal quality of pulse amplitude modulation (PAM) is described, for example, in Document 3.

Document 1: Lian Zhao et al., "10G Linear TIA in Long-reach Multi-mode Applications," inphi corp. (http://www.mpdigest.com/issue/Articles/2008/Japan/inphi/)

Document 2: David Lewis et al., "400G DMT PMD for 2 km SMF," JDSU

Document 3: Francois Tremblay, "PAM-8 and PAM-16 Optical Receivers for 2 km 100G Links with a 4 dB loss budget." (http://www.ieee802.org/3/100GNGOPTX/public/mar12/plenary/)

In considering a scheme for suppressing total harmonics distortion of an optical transmission system, it is preferable that total harmonics distortion generated in a transmitter side and total harmonics distortion generated in a receiver side be estimated individually. However, in a conventional technology, it is difficult to accurately estimate total harmonics distortion generated in an optical receiver. In the configuration illustrated in FIG. 2, for example, total harmonics distortion may be generated in the E/O circuit 12. Therefore, a modulated optical signal (in the example above, an optical sine wave) that is input into the optical receiver 4 may have a large total harmonics distortion. In this case, total harmonics distortion detected based on an output signal of the RF spectrum analyzer 20 includes total harmonics distortion generated in the E/O circuit 12 and total harmonics distortion generated in the optical receiver 4. Accordingly, it is not easy to accurately estimate the total harmonics distortion generated in the optical receiver 4.

SUMMARY

According to an aspect of the present invention, a method for estimating characteristics of an optical receiver includes: generating a modulated optical signal based on an oscillation signal; monitoring an optical spectrum of the modulated optical signal or a spectrum of an electric signal obtained by performing optical-to-electrical conversion on the modulated optical signal; suppressing a modulation component of an upper sideband or a lower sideband of the modulated optical signal based on the optical spectrum of the modulated optical signal or the spectrum of the electric signal; guiding the modulated optical signal in which the modulation component is suppressed to the optical receiver; and estimating the characteristics of the optical receiver based on an output signal of the optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram explaining optical DMT.

FIGS. 4A and 4B are diagrams explaining an optical DMT signal.

FIG. 6 illustrates an example of a light source device.

FIG. 9 illustrates an example of a time waveform of a modulated optical signal.

FIG. 10 is a flowchart illustrating an example of an estimation method according to the first embodiment.

FIGS. 11A-11C illustrate an example of a method for controlling an optical filter.

FIG. 14 illustrates an example of bias control of an I/Q modulator.

FIGS. 15A and 15B illustrate a carrier component and high-order components of a modulated optical signal.

FIG. 17 illustrates an example of bias control of a mach-zehnder modulator.

FIGS. 18A-18C illustrate a carrier component and high-order components of an optical signal in a mach-zehnder modulator.

FIG. 19 illustrates an estimation system in an experimental example.

FIG. 22 illustrates a characteristic (a time waveform) of a light source.

FIG. 23 illustrates frequency dependency of total harmonics distortion of an optical receiver.

FIG. 24 illustrates an example of an estimation system according to a fourth embodiment.

FIGS. 25A and 25B illustrate an example of a method for generating an SSB optical signal according to the fourth embodiment.

DESCRIPTION OF EMBODIMENTS

Figure 1:
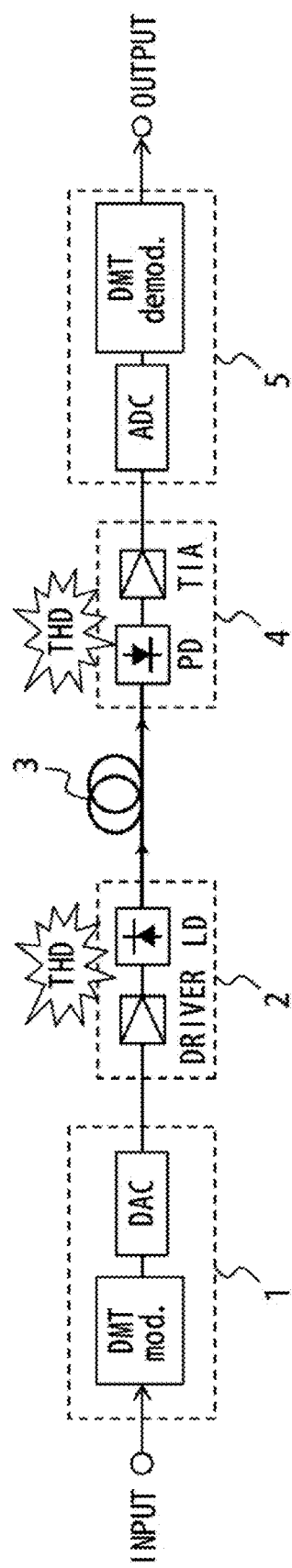
FIG. 1 illustrates an example of an optical transmission system.

In a method according to embodiments of the invention, characteristics of an optical receiver used in an optical transmission system are estimated. The optical transmission system transmits, for example, an optical discrete multi-tone (DMT) signal. Namely, in the method according to the embodiments, characteristics of an optical receiver that receives the optical DMT signal are estimated. Accordingly, optical DMT is briefly described before an estimation method according to the embodiments is described.

DMT is an example of multicarrier modulation based on orthogonal frequency division multiplexing (OFDM), and data is transmitted by using a plurality of subcarriers having different frequencies from each other. At this time, data is transmitted by using each of the subcarriers. In optical DMT, a plurality of subcarriers of a DMT signal are allocated to one wavelength. Namely, a plurality of subcarriers are transmitted by using one wavelength. Therefore, large-capacity data transmission is realized without increasing a transmission rate of each of the subcarriers, by allocating many subcarriers to one wavelength.

In a DMT transmission system, DMT negotiation is performed between a transmitter station and a receiver station before data transmission is started. In DMT negotiation, a probe signal is transmitted from the transmitter station to the receiver station in each of the subcarriers of the DMT signal, as illustrated in FIG. 3. The receiver station detects a transmission characteristic (for example, an SNR) of the probe signal in each of the subcarriers. The number of bits and power to be allocated to each of the subcarriers are determined according to the detected transmission characteristic. At this time, a modulation scheme of each of the subcarriers of the DMT signal is determined. Specifically, a modulation scheme in which a large number of bits per symbol is specified for a subcarrier having a good transmission characteristic, and a modulation scheme in which a small number of bits per symbol is specified for a subcarrier having a poor transmission characteristic.

An optical DMT signal transmits a plurality of subcarrier signals, as described above. Therefore, a difference between the power of carrier light and the power of a modulation component is relatively small, as illustrated in FIG. 4A. Namely, a modulation factor of each of the subcarriers of the optical DMT signal is relatively low. A time waveform of the optical DMT signal is a biased random analog waveform, as illustrated in FIG. 4B. In FIG. 4B, $P_{ave}$ indicates an average power (namely, a bias) of an optical DMT signal, and $P_{amp}$ indicates a modulation amplitude of the optical DMT signal.

When an optical receiver that receives an optical DMT signal has a large total harmonics distortion, the quality of a signal recovered from each of the subcarriers or some of the subcarriers may deteriorate. As an example, when a subcarrier having a certain frequency has a large total harmonics distortion, the quality of a subcarrier having a frequency that matches a harmonics frequency of the certain frequency is likely to deteriorate. Accordingly, it is important to estimate the frequency dependency of the total harmonics distortion of the optical receiver that receives an optical DMT signal.

Figure 2:
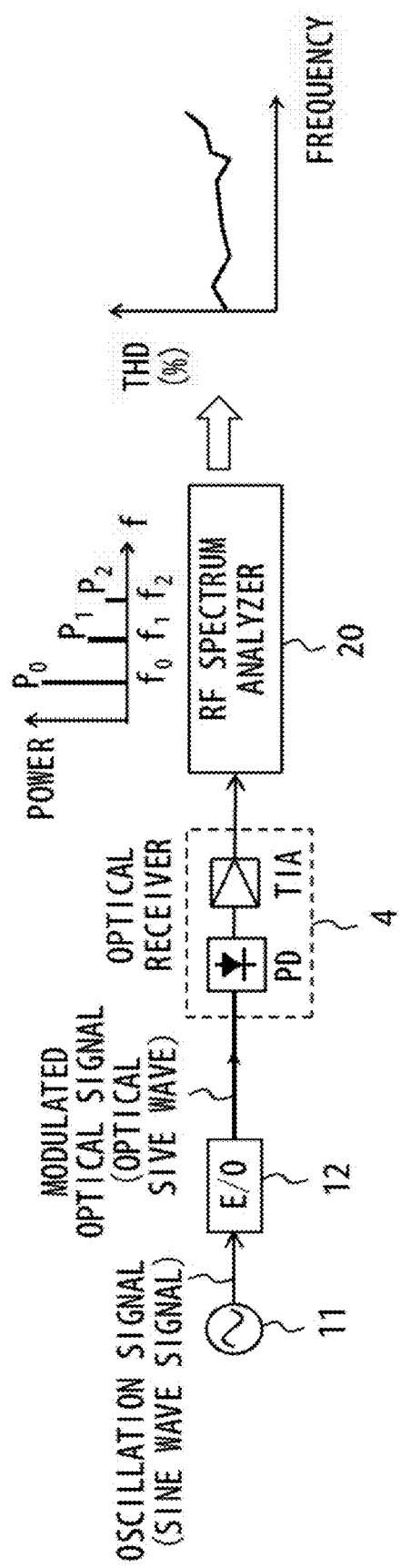
FIG. 2 illustrates an example of a method for estimating total harmonics distortion.

The total harmonics distortion of the optical receiver is estimated, for example, by using the configuration illustrated in FIG. 2. However, when a modulated optical signal (for example, an optical sine wave) that is generated by the oscillator 11 and the E/O circuit 12 has a large total harmonics distortion, the total harmonics distortion of the optical receiver 4 is not estimated accurately.

Figure 5A:
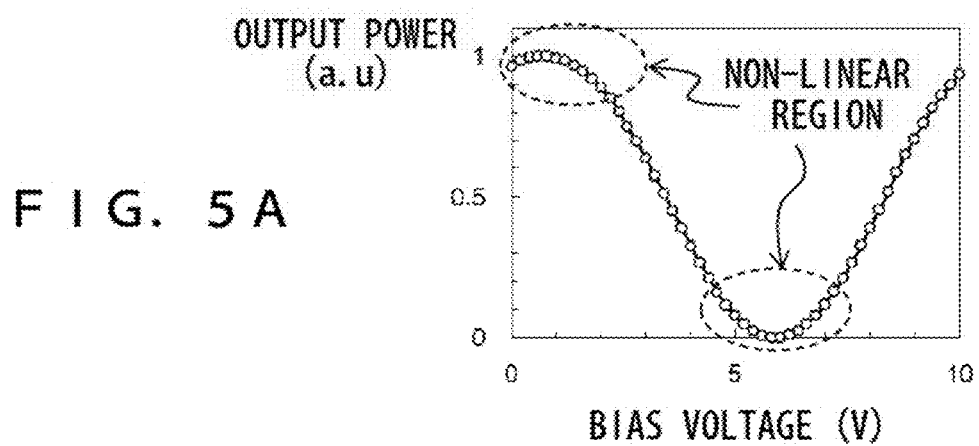
FIGS. 5A-5C illustrate a factor of total harmonics distortion and an example of an RF spectrum having a large total harmonics distortion.

As an example, when total harmonics distortion is generated in the oscillator 11, a modulated optical signal generated by the E/O circuit 12 has a large total harmonics distortion. In a case in which the E/O circuit 12 is implemented by a mach-zehnder modulator, when a bias voltage of the modulator is not adjusted appropriately, total harmonics distortion of a modulated optical signal that is output from the E/O circuit 12 becomes large. It is assumed, for example, that a modulator has the transfer function illustrated in FIG. 5A. In this case, when a modulated optical signal is generated in a non-linear region, total harmonics distortion of the modulated optical signal becomes large. Further, the total harmonics distortion depends on an optical modulation index (OMI) of the modulated optical signal. The OMI is an example of an index for estimating a modulated optical signal, and is expressed according to formula (2).

$$OMI = \frac{P_{amp}}{2P_{ave}} \quad (2)$$

Figure 5B:
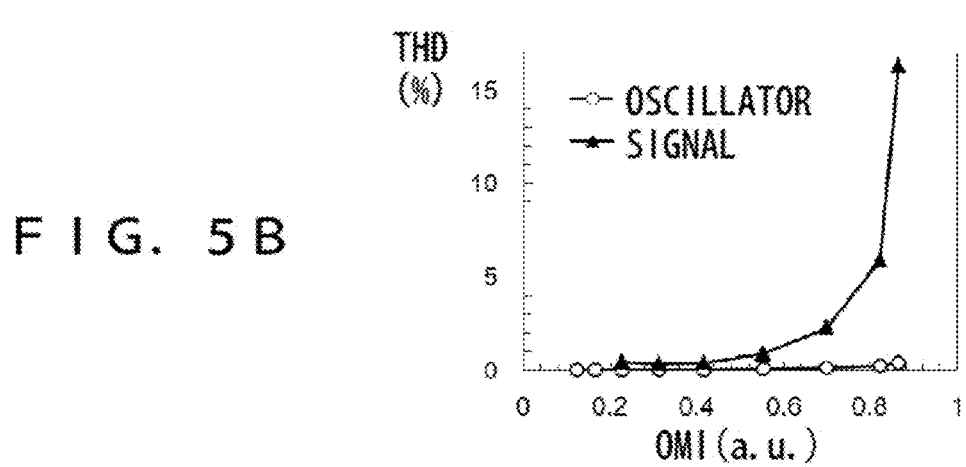

When the OMI of an optical signal is excessively large, a modulated optical signal is generated in a non-linear region, and therefore total harmonics distortion increases, as illustrated in FIG. 5B. In FIG. 5B, the total harmonics distortion of the modulated optical signal is plotted by using triangle symbols. On the other hand, when the OMI of the modulated optical signal is excessively small, an SNR deteriorates.

Figure 5C:
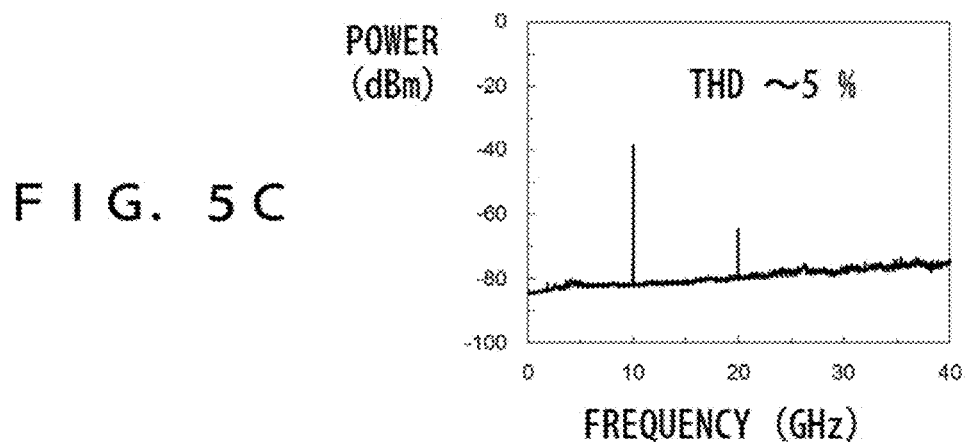

FIG. 5C illustrates an example of an RF spectrum of a modulated optical signal having a large total harmonics distortion. In this example, a modulated optical signal is generated based on a data signal of 10 GHz, and a harmonics component of 20 GHz is generated. Total harmonics distortion is about 5 percent.

As described above, when a modulated optical signal used to estimate the optical receiver 4 has a large total harmonics distortion, it is difficult to accurately estimate the total harmonics distortion generated in the optical receiver 4. Accordingly, the estimation system according to the embodiments has a function for generating a modulated optical signal in which total harmonics distortion is suppressed.

Estimation of total harmonics distortion is not performed only on an optical receiver that receives an optical DMT signal, but may be performed on an optical receiver that receives an optical signal of another modulation scheme. As an example, total harmonics distortion of an optical receiver that receives an optical signal of a pulse amplitude modulation scheme (such as PMA-4 or PMA-8) or a quadrature amplitude modulation scheme (QAM) may be estimated.

Figures 7A, 7B:
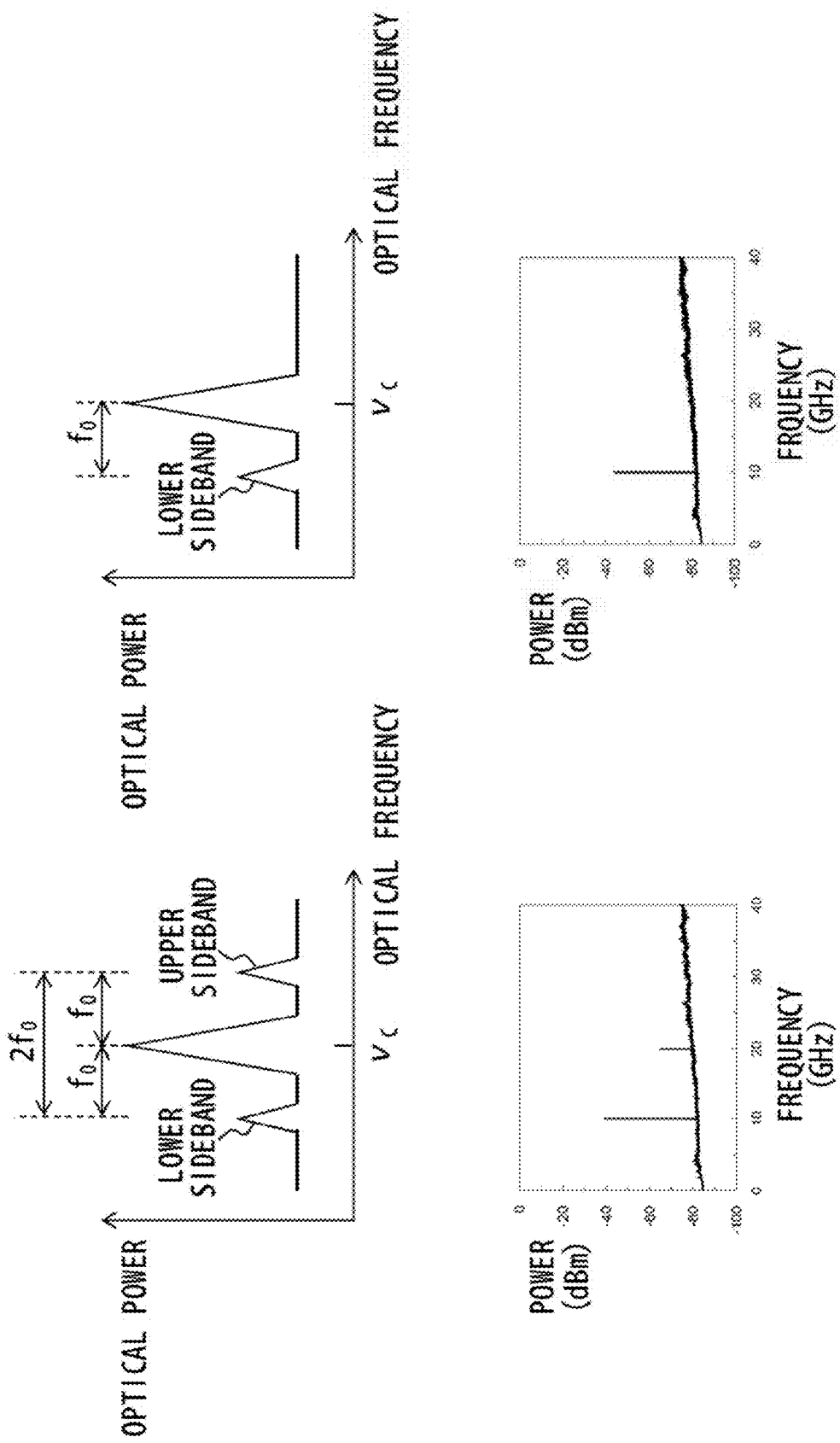
FIGS. 7A and 7B illustrate examples of a DSB optical signal and an SSB optical signal.

FIGS. 6, 7A and 7B are diagrams explaining suppression of total harmonics distortion. In the example illustrated in FIG. 6, a light source device 10 that generates a modulated optical signal includes an oscillator 11, an E/O circuit 12, and an optical spectrum shaper 13. The oscillator 11 oscillates at a frequency that corresponds to a given frequency control signal. The E/O circuit 12 generates a modulated optical signal based on an oscillation signal that is output from the oscillator 11. The optical spectrum shaper 13 suppresses a modulation component of an upper sideband or a lower sideband of the modulated optical signal that is output from the E/O circuit 12. As an example, when the oscillator 11 outputs a sine wave signal, the E/O circuit 12 generates an optical sine wave. The optical spectrum shaper 13 suppresses an upper-sideband modulation component or a lower-sideband modulation component of the optical sine wave.

An optical spectrum analyzer 21, a linear photo detector 22, and an RF spectrum analyzer 23 are used to monitor a state of the modulated optical signal that is output from the light source device 10. Namely, the optical spectrum analyzer 21 detects an optical spectrum of the modulated optical signal that is output from the light source device 10. The linear photo detector 22 performs optical-to-electrical conversion on the modulated optical signal that is output from the light source device 10 so as to generate an electric signal. The RF spectrum analyzer 23 detects an RF spectrum of the electric signal that is output from the linear photo detector 22.

FIG. 7A illustrates a state of the modulated optical signal that is output from the E/O circuit 12. An optical spectrum of the modulated optical signal generated by the E/O circuit 12 has a peak at frequency $v_c$. Frequency $v_c$ indicates an optical frequency of a carrier of the modulated optical signal. When the oscillation frequency of the oscillator 11 is $f_0$, the optical spectrum has peaks at frequencies $v_c \pm f_0$. Stated another way, the modulated optical signal that is output from the E/O circuit 12 has an upper-sideband modulation component and a lower-sideband modulation component. Accordingly, an RF spectrum of the modulated optical signal that is output from the E/O circuit 12 has a component $2f_0$ in addition to a component $f_0$. Namely, a harmonics component $f_1$ (=$2f_0$) that corresponds to a fundamental wave component $f_0$ is generated. In this example, the frequency of the fundamental wave component $f_0$ is 10 GHz.

FIG. 7B illustrates a state of a modulated optical signal that is output from the optical spectrum shaper 13. In this example, the optical spectrum shaper 13 suppresses an upper-sideband modulation component of the modulated optical signal that is output from the E/O circuit 12. Namely, compared with the optical spectrum illustrated in FIG. 7A, an optical signal component having frequency $v_c + f_0$ is suppressed in an optical spectrum of the modulated optical signal that is output from the optical spectrum shaper 13. Consequently, the component $2f_0$ is suppressed in the RF spectrum of the modulated optical signal. Stated another way, the harmonics component $f_1$ (=$2f_0$) is sufficiently suppressed.

As described above, the light source device 10 suppresses one of an upper-sideband modulation component and a lower-sideband modulation component of a modulated optical signal so as to generate a modulated optical signal in which a harmonics component is suppressed. Namely, a double-sideband (DSB) optical signal is substantially converted into a single-sideband (SSB) optical signal so as to generate a modulated optical signal in which total harmonics distortion is suppressed.

First Embodiment

Figure 8:
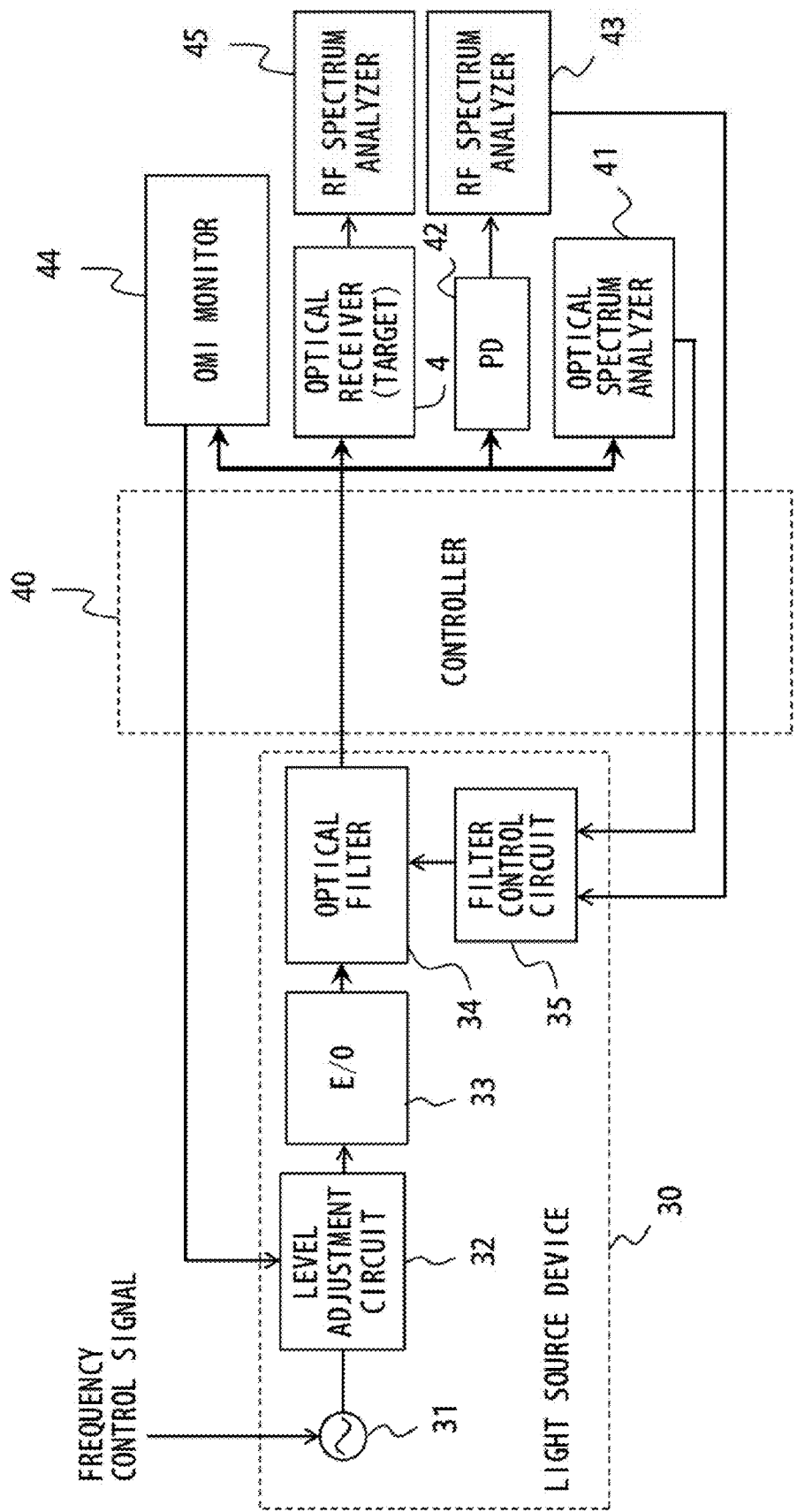
FIG. 8 illustrates an example of an estimation system according to a first embodiment.

FIG. 8 illustrates an example of an estimation system according to a first embodiment of the invention. The estimation system according to the first embodiment includes a light source device 30, an optical spectrum analyzer 41, a linear photo detector 42, an RF spectrum analyzer 43, an OMI monitor 44, and an RF spectrum analyzer 45, as illustrated in FIG. 8. The estimation system estimates characteristics of a measurement target by using a modulated optical signal generated by the light source device 30. The measurement target is, for example, the optical receiver 4 that receives an optical DMT signal. The measurement target may be an optical receiver that receives an optical signal that is generated by using another modulation scheme.

The light source device 30 includes an oscillator 31, a level adjustment circuit 32, an E/O converter 33, an optical filter 34, and a filter controller 35, as illustrated in FIG. 8. The light source device 30 generates a modulated optical signal used to estimate characteristics of the optical receiver 4.

The oscillator 31 oscillates at a frequency that corresponds to a given frequency control signal. Namely, the oscillator 31 outputs an oscillation signal of frequency $f_0$ that is specified by the frequency control signal. The oscillation signal is, for example, a sine wave signal.

The level adjustment circuit 32 adjusts the amplitude of the oscillation signal that is output from the oscillator 31 in accordance with a monitoring result of the OMI monitor 44. The OMI monitor 44 measures an OMI of the modulated optical signal generated by the light source device 30. The level adjustment circuit 32 adjusts the amplitude of the oscillation signal that is output from the oscillator 31 in such a way that the OMI of the modulated optical signal approaches a specified target value. The level adjustment circuit 32 is configured to include, for example, an amplifier and/or an attenuator.

The E/O converter 33 generates a modulated optical signal based on the oscillation signal for which an amplitude is adjusted by the level adjustment circuit 32. The E/O converter 33 is not particularly limited, but is implemented, for example, by a direct-modulation laser. Alternatively, the E/O converter 33 may be configured by a mach-zehnder modulator or an electro-absorption modulator (an EA modulator). In this case, a modulation factor of output light of the E/O converter 33 changes according to the oscillation signal that is given via the level adjustment circuit 32. Stated another way, the E/O converter 33 may generate an intensity-modulated optical signal based on the oscillation signal.

The optical filter 34 is an example of the optical spectrum shaper 13 illustrated in FIG. 6, and filters a modulated optical signal that is output from the E/O converter 33. The optical filter 34 is, for example, an optical band pass filter that transmits an optical frequency band specified by the filter controller 35. In this case, the center frequency of a passband of the optical filter 34 is specified by the filter controller 35. The width of the passband of the optical filter 34 may be fixed or variable. When the width of the passband of the optical filter 34 is variable, the width of the passband may be controlled according to an oscillation frequency of the oscillator 31. The optical filter 34 is not limited to an optical band pass filter, and may be an optical band block filter. In the description below, it is assumed that the optical filter 34 is an optical band pass filter.

The filter controller 35 controls the center frequency of the passband of the optical filter 34 in accordance with an optical spectrum detected by the optical spectrum analyzer 41. Alternatively, the filter controller 35 may control the center frequency of the passband of the optical filter 34 in accordance with an RF spectrum detected by the RF spectrum analyzer 43. In any case, the filter controller 35 controls the center frequency of the passband of the optical filter 34 in such a way that total harmonics distortion of the modulated optical signal that is output from the optical filter 34 is suppressed. Accordingly, the light source device 30 can generate a modulated optical signal in which total harmonics distortion is suppressed.

The optical spectrum analyzer 41 detects an optical spectrum of the modulated optical signal generated by the light source device 30. The linear photo detector 42 performs optical-to-electrical conversion on the modulated optical signal generated by the light source device 30 so as to generate a corresponding electric signal. It is assumed that the linear photo detector 42 can generate a current that is substantially proportional to an intensity of input light over the entire signal band of the optical receiver 4. The RF spectrum analyzer 43 detects an RF spectrum of an output signal (namely, an electric signal obtained by performing optical-to-electrical conversion on a modulated optical signal) of the linear photo detector 42. Stated another way, the RF spectrum analyzer 43 detects a distribution of an intensity of an RF component of the modulated optical signal generated by the light source device 30. The RF component includes an oscillation signal generated by the oscillator 31 and its harmonics.

The OMI monitor 44 monitors an optical waveform of the modulated optical signal that is output from the light source device 30. FIG. 9 illustrates an example of a time waveform of an optical signal observed by the OMI monitor 44. In this example, an oscillation signal generated by the oscillator 31 is a sine wave. The OMI monitor 44 detects an average power ($P_{ave}$) and a modulation amplitude ($P_{amp}$) of the modulated optical signal. Accordingly, an OMI of the modulated optical signal that is output from the light source device 30 is calculated based on a monitoring result of the OMI monitor 44. Namely, the OMI is calculated according to formula (2) above. The OMI of the modulated optical signal may be calculated by the OMI monitor 44, may be calculated based on the average power and the modulation amplitude that are observed by the OMI monitor 44 by a computer that is connected to the OMI monitor 44, or may be calculated based on the average power and the modulation amplitude that are observed by the OMI monitor 44 by a user. The OMI monitor 44 may be implemented, for example, by an oscilloscope.

As described above, the operation of the light source device 30 is controlled according to a state of the modulated optical signal that is output from the light source device 30. Control is performed, for example, by a user. In this case, the user may reference the optical spectrum detected by the optical spectrum analyzer 41 or the RF spectrum detected by the RF spectrum analyzer 43, and the user may manually control the center frequency of a passband of the optical filter 34 by using the filter controller 35. The user may reference the average power and the modulation amplitude of the modulated optical signal that are detected by the OMI monitor 44, and may manually operate the level adjustment circuit 32 so as to control the amplitude of an oscillation signal.

Alternatively, the operation state of the light source device 30 may be controlled by an automatic feedback system. In this case, the estimation system includes a controller 40, as illustrated in FIG. 8. The controller 40 issues an instruction to the filter controller 35 according to the optical spectrum detected by the optical spectrum analyzer 41 or the RF spectrum detected by the RF spectrum analyzer 43. In addition, the controller 40 issues an instruction to the level adjustment circuit 32 according to the average power and the modulation amplitude of the modulated optical signal that are detected by the OMI monitor 44. The controller 40 may be implemented by a processor and a memory. In this case, the processor controls the light source device 30 by executing a given program.

In another configuration, each of the filter controller 35 and the level adjustment circuit 32 may include an information processing function. In this case, the filter controller 35 controls the optical filter 34 according to the optical spectrum detected by the optical spectrum analyzer 41 or the RF spectrum detected by the RF spectrum analyzer 43. In addition, the level adjustment circuit 32 may calculate an OMI from the average power and the modulation amplitude of a modulated optical signal that are detected by the OMI monitor 44, and may control the amplitude of an oscillation signal according to the OMI.

FIG. 10 is a flowchart illustrating an example of an estimation method according to the first embodiment. In the example illustrated in FIG. 10, the controller 40 illustrated in FIG. 8 controls the light source device 30. Specifically, the controller 40 controls the light source device 30 according to the optical spectrum detected by the optical spectrum analyzer 41.

In S1, the controller 40 performs initial setting. The initial setting includes a procedure for specifying a frequency condition for which characteristics of the optical receiver 4 are measured. The frequency condition includes information indicating a start frequency, an end frequency, and a frequency spacing. As an example, "start frequency: 1 GHz", "end frequency: 25 GHz", and "frequency spacing: 1 GHz" are specified as the frequency condition.

In S2, the oscillator 31 starts outputting an oscillation signal. At this time, the oscillator 31 oscillates at a specified start frequency. In S3, the E/O converter 33 generates a modulated optical signal based on the oscillation signal that is output from the oscillator 31. The modulated optical signal that is output from the E/O converter 33 is a double-sideband optical signal, as illustrated in FIG. 11A. Namely, the modulated optical signal that is output from the E/O converter 33 has an upper-sideband modulation component and a lower-sideband modulation component. In FIG. 11A, $v_c$ is an optical frequency of a carrier of a modulated optical signal, and $f_0$ corresponds to an oscillation frequency of the oscillator 31.

In S4, the controller 40 and the filter controller 35 configure a passband of the optical filter 34. Specifically, as illustrated in FIG. 11B, the optical filter 34 is controlled in such a way that the center frequency of the passband matches an optical frequency of a carrier of the modulated optical signal. When the width of the passband of the optical filter 34 is variable, the width of the passband is set to $2f_0+\alpha$. $\alpha$ is determined in such a way that the upper-sideband modulation component and the lower-sideband modulation component pass through the optical filter 34 when the center frequency of the passband matches the optical frequency of the carrier of the modulated optical signal.

In S5 and S6, the optical spectrum analyzer 41 detects an optical spectrum of the modulated optical signal that is output from the optical filter 34. The controller 40 determines whether one of the upper-sideband modulation component and the lower-sideband modulation component is sufficiently suppressed in the optical spectrum detected by the optical spectrum analyzer 41. The phrase "sufficiently suppressed" refers, for example, to a state in which one of the upper-sideband modulation component and the lower-sideband modulation component is substantially removed.

When one of the upper-sideband modulation component and the lower-sideband modulation component is not sufficiently suppressed, the controller 40 and the filter controller 35 shifts the center frequency of the passband of the optical filter 34 by a specified amount. The processes of S5-S7 are repeatedly performed until one of the upper-sideband modulation component and the lower-sideband modulation component is sufficiently suppressed. When one of the upper-sideband modulation component and the lower-sideband modulation component is sufficiently suppressed, processing of the estimation system moves on to S8.

As an example, in a case in which the upper-sideband modulation component of the modulated optical signal is suppressed, the controller 40 and the filter controller 35 decreases the center frequency of the passband of the optical filter 34 by a specified amount in S7. The processes of S5-S7 are repeatedly performed until the upper-sideband modulation component is sufficiently suppressed. FIG. 11C illustrates a state of the optical filter 34 when the upper-sideband modulation component is sufficiently suppressed.

The controller 40 has a function for detecting a peak in the optical spectrum detected by the optical spectrum analyzer 41. The controller 40 also has a function for detecting a change in the peak of the optical spectrum according to the control of the center frequency of the passband of the optical filter 34. The controller 40 determines whether one of the upper-sideband modulation component and the lower-sideband modulation component of the modulated optical signal is sufficiently suppressed, by using the functions above.

In S8 and S9, the OMI monitor 44 monitors the average power and the modulation amplitude of the modulated optical signal that is output from the optical filter 34. The controller 40 calculates an OMI from the average power and the modulation amplitude of the modulated optical signal that are observed by the OMI monitor 44. The OMI is calculated according to formula (2) above. The controller 40 determines whether the OMI matches a target value. It is assumed that the term "match" does not include only a state in which the OMI completely matches the target value, but also includes a state in which the OMI substantially matches the target value. It is also assumed that the target value is specified in advance through experiment, simulation, or the like. The target value is determined so as to be within a range of 0.3 to 0.6, for example.

When the OMI of the modulated optical signal that is output from the optical filter 34 does not match the target value, the controller 40 and the level adjustment circuit 32 adjust the amplitude of the oscillation signal in S10. Namely, when the OMI of the modulated optical signal is greater than the target value, the controller 40 and the level adjustment circuit 32 reduce the amplitude of the oscillation signal. When the OMI of the modulated optical signal is smaller than the target value, the controller 40 and the level adjustment circuit 32 increase the amplitude of the oscillation signal. The processes of S8-S10 are repeatedly performed until the OMI matches the target value. When the OMI matches the target value, processing of the estimation system moves on to S11.

When the processes of S5-S10 are finished, one of the upper-sideband modulation component and the lower-sideband modulation component of the modulated optical signal that is output from the light source device 30 is sufficiently suppressed. Consequently, a modulated optical signal in which the harmonics component of the oscillation signal is sufficiently suppressed is obtained. In addition, the OMI of the modulated optical signal is adjusted to the target value. Accordingly, total harmonics distortion of the modulated optical signal that is output from the light source device 30 is small. Stated another way, the modulated optical signal that is output from the light source device 30 is adjusted in a state that is suitable to estimate characteristics (in particular, total harmonics distortion) of an optical receiver. The modulated optical signal that is output from the light source device 30 is input into the optical receiver 4.

In S11, the RF spectrum analyzer 45 monitors an RF spectrum of an output signal of the optical receiver 4. In this example, the optical receiver 4 is implemented by a photo detector (PD) and an amplifier (TIA), as illustrated in FIG. 1 or FIG. 2. Accordingly, the optical receiver 4 outputs an electric signal obtained by performing optical-to-electrical conversion on an input modulated optical signal. The RF spectrum analyzer 45 monitors an RF spectrum of the electric signal. Consequently, characteristics of the optical receiver 4 are estimated. In this example, a fundamental component power and a harmonics power of the output signal of the optical receiver 4 are detected, and the total harmonics distortion of the optical receiver 4 is calculated according to the fundamental component power and the harmonics power. The total harmonics distortion is calculated according to formula (1) above. The calculated total harmonics distortion is recorded in a memory in association with the oscillation frequency $f_0$ of the oscillator 31.

In S12, the controller 40 determines whether the oscillation frequency of the oscillator 31 reaches the end frequency. When the oscillation frequency of the oscillator 31 does not reach the end frequency, the controller 40 increases the oscillation frequency of the oscillator 31 by a specified amount in S13. The specified frequency corresponds to the frequency spacing specified in S1. Then, processing of the estimation system returns to S4. Namely, total harmonics distortion is calculated for each of a plurality of measurement frequencies within the frequency range specified in S1 in S4-S11. Consequently, the frequency dependency of the total harmonics distortion of the optical receiver 4 is obtained.

Figure 12:
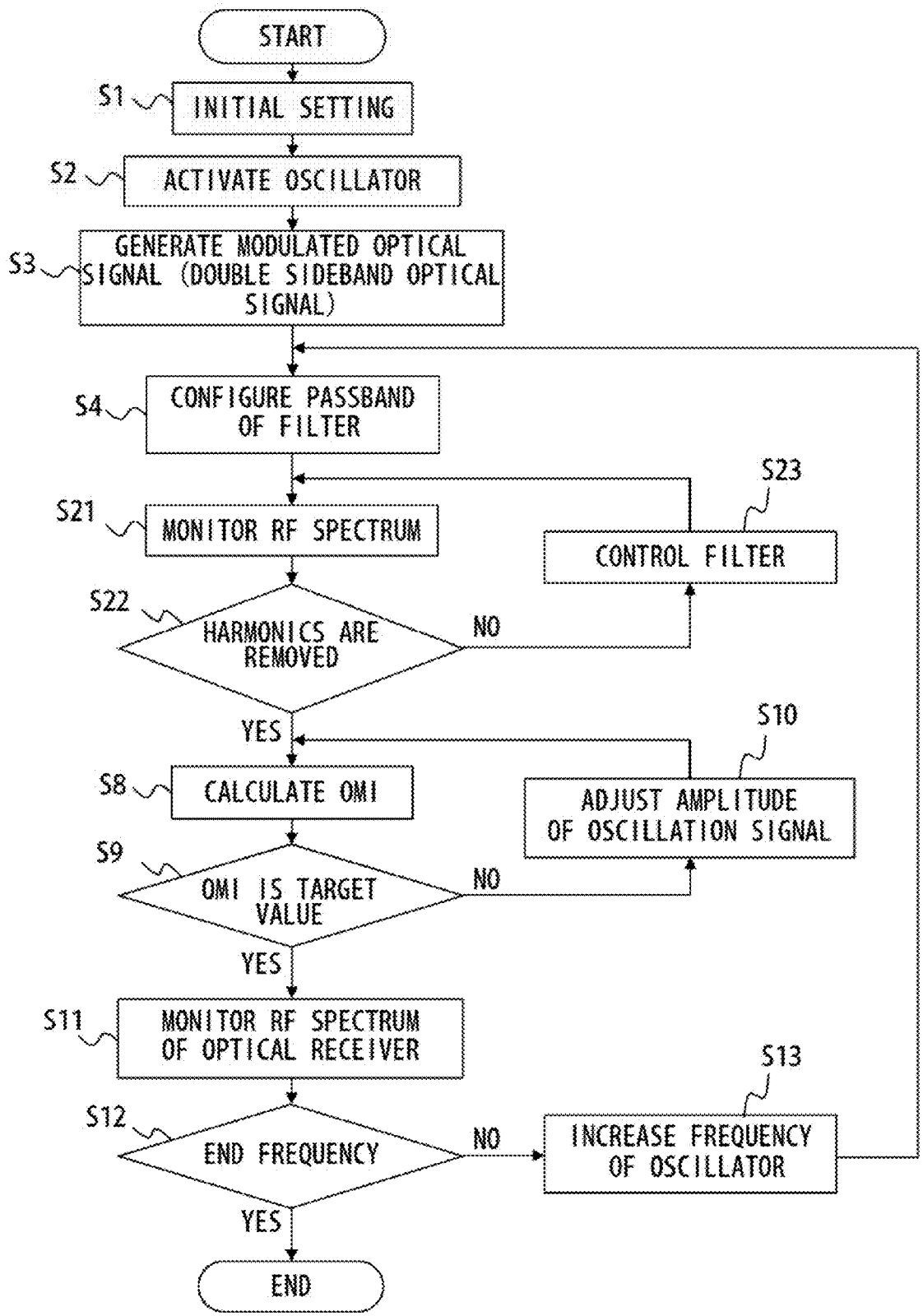
FIG. 12 is a flowchart illustrating another example of the estimation method according to the first embodiment.

FIG. 12 is a flowchart illustrating another example of the estimation method according to the first embodiment. Also in the example illustrated in FIG. 12, the controller 40 illustrated in FIG. 8 controls the light source device 30. However, the controller 40 controls the light source device 30 according to the RF spectrum detected by the RF spectrum analyzer 43. Accordingly, in the method illustrated in FIG. 12, the processes of S21-S23 are performed instead of the processes of S5-S7 in FIG. 10. The processes of S1-S4 and S8-S13 are substantially the same in the method illustrated in FIG. 10 and the method illustrated in FIG. 12.

In S21 and S22, the linear photo detector 42 converts the modulated optical signal that is output from the optical filter 34 into an electric signal. The RF spectrum analyzer 43 detects an RF spectrum of an output signal of the linear photo detector 42. The controller 40 determines whether a harmonics component of an oscillation signal is sufficiently suppressed in the RF spectrum detected by the RF spectrum analyzer 43. Specifically, it is determined whether, for example, a double-frequency component of the oscillation frequency of the oscillator 31 is sufficiently suppressed. Also in this example, the phrase "sufficiently suppressed" refers to a state in which the double-frequency component is substantially removed.

When the harmonics component is not sufficiently suppressed, the controller 40 and the filter controller 35 shift the center frequency of the passband of the optical filter 34 by a specified amount in S23. The processes of S21-S23 are repeatedly performed until the harmonics component of the oscillation signal is sufficiently suppressed. When the harmonics component is sufficiently suppressed, processing of the estimation system moves on to S8. The operations in S23 of the controller 40 and the filter controller 35 are substantially the same as the operations in S7 of FIG. 10.

In the method illustrated in FIG. 12, a harmonics component of an oscillation signal is suppressed by controlling an optical filter according to an RF spectrum of a modulated optical signal. However, suppression of the harmonics component of the oscillation signal is realized by suppressing one of an upper-sideband modulation component and a lower-sideband modulation component of the modulated optical signal. Stated another way, also in the method illustrated in FIG. 12, one of the upper-sideband modulation component and the lower-sideband modulation component of the modulated optical signal is substantially suppressed.

As described above, in the first embodiment, a modulated optical signal is filtered according to an optical spectrum of the modulated optical signal or an RF spectrum of an electric signal obtained by performing optical-to-electrical conversion on the modulated optical signal such that total harmonics distortion of the modulated optical signal is suppressed. Namely, a modulated optical signal that is suitable to estimate characteristics (in particular, total harmonics distortion) of an optical receiver is generated. Accordingly, the total harmonics distortion of the optical receiver can be estimated accurately by using the modulated optical signal above.

Second Embodiment

Figure 13:
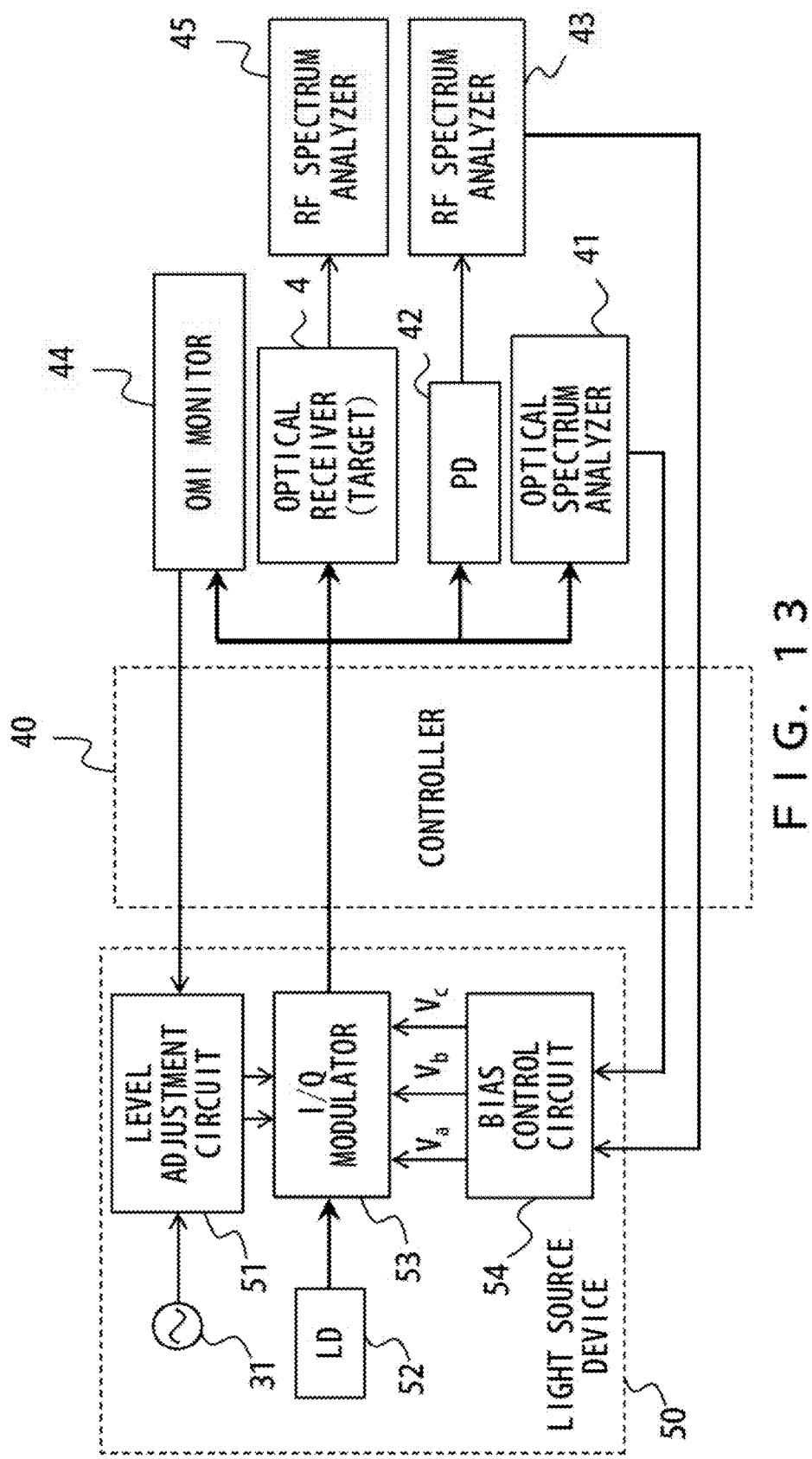
FIG. 13 illustrates an example of an estimation system according to a second embodiment.

FIG. 13 illustrates an example of an estimation system according to a second embodiment of the invention. The estimation system according to the second embodiment includes a light source device 50, an optical spectrum analyzer 41, a linear photo detector 42, an RF spectrum analyzer 43, an OMI monitor 44, and an RF spectrum analyzer 45. The estimation system estimates characteristics of the optical receiver 4 by using a modulated optical signal generated by the light source device 50.

The optical spectrum analyzer 41, the linear photo detector 42, the RF spectrum analyzer 43, the OMI monitor 44, and the RF spectrum analyzer 45 are substantially the same in the first embodiment and the second embodiment, and the description thereof is omitted. Also in the second embodiment, a controller 40 may be implemented between the light source device 50 and a monitor system (the optical spectrum analyzer 41, the RF spectrum analyzer 43, and the OMI monitor 44).

The light source device 50 includes an oscillator 31, a level adjustment circuit 51, a light source (LD) 52, an I/Q modulator 53, and a bias control circuit 54. The oscillator 31 outputs an oscillation signal of a frequency specified by a frequency control signal, similarly to the first embodiment.

The level adjustment circuit 51 adjusts the amplitude of the oscillation signal that is output from the oscillator 31, in accordance with a monitoring result of the OMI monitor 44. Specifically, the level adjustment circuit 51 adjusts the amplitude of the oscillation signal that is output from the oscillator 31 in such a way that an OMI of the modulated optical signal approaches a specified target value. In addition, the level adjustment circuit 51 includes a 90-degree hybrid circuit, and generates a drive signal RFA and a drive signal RFB from the oscillation signal. The frequencies of the drive signal RFA and the drive signal RFB are the same as that of the oscillation signal. However, the phase of the drive signal RFB is shifted 90 degrees with respect to the phase of the drive signal RFA.

The light source 52 outputs continuous wave light of a specified optical frequency (namely, a specified wavelength). The I/Q modulator 53 modulates the continuous wave light that is output from the light source 52 by using the drive signal RFA and the drive signal RFB that are generated by the level adjustment circuit 51 so as to generate a modulated optical signal. Accordingly, an optical frequency of the continuous wave light corresponds to a carrier frequency $v_c$ of the modulated optical signal. The modulated optical signal generated by the I/Q modulator 53 is used to estimate characteristics of the optical receiver 4.

The bias control circuit 54 controls a bias of the I/Q modulator 53 according to the optical spectrum detected by the optical spectrum analyzer 41 or the RF spectrum detected by the RF spectrum analyzer 43. Here, the I/Q modulator 53 includes a mach-zehnder modulator MZA and a mach-zehnder modulator MZB that are implemented in parallel. The bias control circuit 54 controls a bias voltage $V_A$ of the mach-zehnder modulator MZA, a bias voltage $V_B$ of the mach-zehnder modulator MZB, and a bias voltage $V_C$ for adjusting a phase difference between the mach-zehnder modulator MZA and the mach-zehnder modulator MZB.

FIG. 14 illustrates an example of bias control of the I/Q modulator 53. In FIG. 14, an optical input $E_{in}$ indicates the continuous wave light generated by the light source 52. An optical output $E_{out}$ indicates the modulated optical signal generated by the I/Q modulator 53. A 90-degree hybrid circuit 51a is provided in the level adjustment circuit 51 illustrated in FIG. 13. The 90-degree hybrid circuit 51a generates a drive signal RFA ($\cos(\omega t+\theta)$) and a drive signal RFB ($\sin(\omega t+\theta)$).

The I/Q modulator 53 is configured by a mach-zehnder modulator MZC. The mach-zehnder modulator MZA and the mach-zehnder modulator MZB are respectively formed in an I-arm and a Q-arm of the mach-zehnder modulator MZC. The input continuous wave light $E_{in}$ is guided to the I-arm and the Q-arm of the mach-zehnder modulator MZC. Stated another way, the input continuous wave light $E_{in}$ is guided to the mach-zehnder modulator MZA and the mach-zehnder modulator MZB. The mach-zehnder modulator MZA modulates the continuous wave light by using the drive signal RFA so as to generate a modulated optical signal A. The mach-zehnder modulator MZB modulates the continuous wave light by using the drive signal RFB so as to generate a modulated optical signal B. The modulated optical signal A and the modulated optical signal B are combined so as to generate a modulated optical signal $E_{out}$. An electric field of the modulated optical signal $E_{out}$ that is output from the I/Q modulator 53 can be expressed according to formula (3).

$$E_{out} = \frac{1}{\sqrt{2}} E_{in} \sum_{-\infty}^{+\infty} a_n J_n\left(\frac{\pi}{\sqrt{2}\,m}\right) e^{jn(\omega t+\theta)} \quad (3)$$

$$a_n = j^n [e^{j\varphi_A} + (-1)^n e^{-j\varphi_A}] e^{j\varphi_C} + [e^{j\varphi_B} + (-1)^n e^{-j\varphi_B}] e^{-j\varphi_C} \quad (4)$$

m indicates a modulation factor. $J_n$ indicates a Bessel function. A coefficient $a_n$ depends on phases $\varphi_A$, $\varphi_B$, and $\varphi_C$ of the mach-zehnder modulators MZA, MZB, and MZC, as indicated by formula (4). The phase $\varphi_A$ of the mach-zehnder modulator MZA, the phase $\varphi_B$ of the mach-zehnder modulator MZB, and the phase $\varphi_C$ of the mach-zehnder modulator MZC are respectively controlled by the bias voltage $V_A$, the bias voltage $V_B$, and the bias voltage $V_C$.

FIG. 15A illustrates a state of a light wave of the modulated optical signal generated by the I/Q modulator 53. $J_0$ indicates a carrier component, and $J_i$ $J_{-i}$ and indicate modulation components.

Suppression of total harmonics distortion of a modulated optical signal is realized by reducing $a_1 J_1$ or $a_{-1} J_{-1}$ in formula (3). As an example, FIG. 15B illustrates a state in which $a_{-1} J_{-1}$ is zero. It is assumed that each component in a higher order than $J_1$ and $J_{-1}$ is sufficiently smaller than $J_1$ and $J_{-1}$. When $a_1$ is zero, $a_1 J_1$ is zero, and when $a_{-1}$ is zero, $a_{-1} J_{-1}$ is zero. Accordingly, one of the upper-sideband modulation component and the lower-sideband modulation component of the modulated optical signal is suppressed by reducing $a_1$ or $a_{-1}$ to zero. Stated another way, by controlling $a_1$ or $a_{-1}$ to zero, an SSB modulated optical signal is obtained, and the total harmonics distortion of the modulated optical signal is suppressed.

The coefficient $a_n$ depends on the phases of the mach-zehnder modulators MZA, MZB, and MZC, as expressed by formula (4). $a_1$=zero or $a_{-1}$=zero is realized when the following conditions are satisfied.

$\varphi_A = \varphi_B$      Condition 1:

$\varphi_C = \pi/4$ or $\varphi_C = -\pi/4$      Condition 2:

As described above, in the second embodiment, a modulated optical signal in which total harmonics distortion is suppressed is generated by controlling the phase of the I/Q modulator 53. Here, the phase of the I/Q modulator 53 is controlled by the bias voltages $V_A$, $V_B$, and $V_C$.

The estimation system according to the second embodiment may estimate characteristics of the optical receiver 4 according to the flowchart illustrated in FIG. 10 or 12. However, a method for generating a modulated optical signal is slightly different between the first embodiment and the second embodiment. The process of S4 is not performed in the second embodiment.

As an example, when the flowchart illustrated in FIG. 10 is performed, the controller 40 and the bias control circuit 54 control the bias voltages $V_A$, $V_B$, and $V_C$ of the I/Q modulator 53 in accordance with the optical spectrum detected by the optical spectrum analyzer 41, instead of the process of S7. Specifically, the controller 40 and the bias control circuit 54 control the bias voltages $V_A$, $V_B$, and $V_C$ in such a way that one of the upper-sideband modulation component and the lower-sideband modulation component of the modulated optical signal that is output from the light source device 50 is suppressed. Bias control is repeatedly performed until one of the upper-sideband modulation component and the lower-sideband modulation component is sufficiently suppressed.

In a case in which the flowchart illustrated in FIG. 12 is performed, the controller 40 and the bias control circuit 54 control the bias voltages $V_A$, $V_B$, and $V_C$ of the I/Q modulator 53 in accordance with the RF spectrum detected by the RF spectrum analyzer 43, instead of the process of S23. Specifically, the controller 40 and the bias control circuit 54 control the bias voltages $V_A$, $V_B$, and $V_C$ in such a way that a second-order harmonics component of the oscillation signal is suppressed. Bias control is repeatedly performed until the second-order harmonics component of the oscillation signal is sufficiently suppressed. Note that in controlling the bias voltages $V_A$, $V_B$, and $V_C$, one of the bias voltages $V_A$ and $V_B$ may be fixed.

Further, when the flowchart illustrated in FIG. 10 or 12 is performed, the level adjustment circuit 51 controls the amplitude of the oscillation signal in such a way that an OMI of the modulated optical signal approaches a target value, in accordance with the monitoring result of the OMI monitor 44 in S10. The level adjustment circuit 51 generates the drive signal RFA and the drive signal RFB from the oscillation signal in which the amplitude is adjusted, and gives the drive signals to the I/Q modulator 53.

As described above, in the second embodiment, a bias of the I/Q modulator 53 is controlled according to an optical spectrum of a modulated optical signal or an RF spectrum of an electric signal obtained by performing optical-to-electrical conversion on the modulated optical signal such that total harmonics distortion of the modulated optical signal is suppressed. Namely, also in a configuration according to the second embodiment, a modulated optical signal that is suitable to estimate characteristics (in particular, total harmonics distortion) of an optical receiver is generated.

In addition, in the second embodiment, an SSB modulated optical signal is generated by using an I/Q modulator. Therefore, even when the frequency of an oscillation signal is lower than 1 GHz, a harmonics component of the oscillation signal can be sufficiently suppressed. Accordingly, the estimation system according to the second embodiment can accurately estimate total harmonics distortion of an optical receiver even in frequency range near a DC.

Third Embodiment

Figure 16:
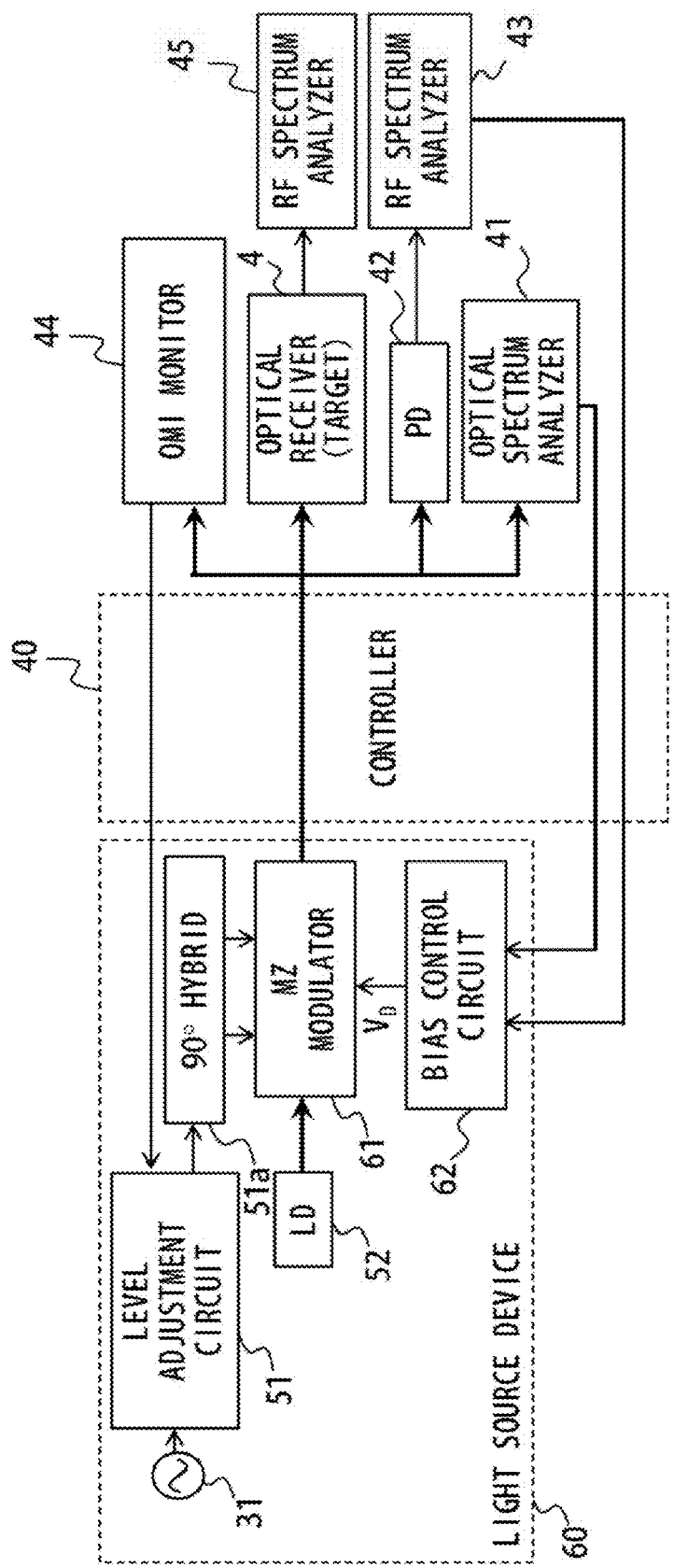
FIG. 16 illustrates an example of an estimation system according to a third embodiment.

FIG. 16 illustrates an example of an estimation system according to a third embodiment of the invention. The estimation system according to the third embodiment includes a light source device 60, an optical spectrum analyzer 41, a linear photo detector 42, an RF spectrum analyzer 43, an OMI monitor 44, and an RF spectrum analyzer 45. The estimation system estimates characteristics of the optical receiver 4 by using a modulated optical signal generated by the light source device 60.

The optical spectrum analyzer 41, the linear photo detector 42, the RF spectrum analyzer 43, the OMI monitor 44, and the RF spectrum analyzer 45 are substantially the same in the first embodiment and the third embodiment, and the description thereof is omitted. Also in the third embodiment, a controller 40 may be implemented between the light source device 60 and a monitor system (the optical spectrum analyzer 41, the RF spectrum analyzer 43, and the OMI monitor 44).

The light source device 60 includes an oscillator 31, a level adjustment circuit 51, a 90-degree hybrid circuit 51*a*, a light source (LD) 52, a mach-zehnder modulator 61, and a bias control circuit 62. The oscillator 31 outputs an oscillation signal of a frequency specified by a frequency control signal, similarly to the first embodiment and the second embodiment.

The level adjustment circuit 51, the 90-degree hybrid circuit 51*a*, and the light source 52 are substantially the same in the second embodiment and the third embodiment. Namely, the level adjustment circuit 51 adjusts the amplitude of the oscillation signal that is output from the oscillator 31 in such away that an OMI of the modulated optical signal approaches a specified target value. The 90-degree hybrid circuit 51*a* generates a drive signal RFA and a drive signal RFB from the oscillation signal for which the amplitude is adjusted. The light source 52 outputs continuous wave light of a specified optical frequency (namely, a specified wavelength).

The mach-zehnder modulator 61 modulates the continuous wave light that is output from the light source 52 by using the drive signal RFA and the drive signal RFB so as to generate a modulated optical signal. The mach-zehnder modulator 61 includes a first arm and a second arm, and the drive signal RFA and the drive signal RFB are respectively given to the first arm and the second arm. The modulated optical signal generated by the mach-zehnder modulator 61 is used to estimate characteristics of the optical receiver 4. The bias control circuit 62 controls a bias of the mach-zehnder modulator 61 according to the optical spectrum detected by the optical spectrum analyzer 41 or the RF spectrum detected by the RF spectrum analyzer 43.

FIG. 17 illustrates an example of bias control of the mach-zehnder modulator 61. In FIG. 17, an optical input A*cos (ωt) indicates the continuous wave light generated by the light source 52. The 90-degree hybrid circuit 51*a* generates a drive signal RFA (cos (pt)) and a drive signal RFB (sin(pt)).

The mach-zehnder modulator 61 includes a first arm and a second arm. The input continuous wave light is guided to the first arm and the second arm. The drive signal RFA (cos(pt)) is given to the first arm, and the drive signal RFB (sin(pt)) is given to the second arm. Further, it is assumed that a bias voltage $V_D$ that generates a phase difference Vπ/2 (or −Vπ/2) between the first arm and the second arm is given to the mach-zehnder modulator 61. In the example illustrated in FIG. 17, the bias voltage $V_D$ that generates a phase shift Vπ/2 (or −Vπ/2) is applied to the second arm. An output optical intensity of the mach-zehnder modulator 61 periodically changes with respect to an applied voltage. A voltage for one cycle of a change in the output optical intensity is expressed by "2Vπ".

When the above bias voltage $V_D$ is applied to the mach-zehnder modulator 61, a light wave of the first arm is expressed according to formula (5). Namely, the light wave of the first arm is expressed by an even function. A light wave of the second arm is expressed according to formula (6). Namely, the light wave of the second arm is expressed by an odd function.

$$\frac{A}{2}\cos(\omega t + m\cos(pt)) = \frac{A}{2}\sum_{-\infty}^{+\infty} J_n(m)\cos\left\{\omega t + n\left(pt + \frac{\pi}{2}\right)\right\} \quad (5)$$

$$\frac{A}{2}\sin(\omega t + m\sin(pt)) = \frac{A}{2}\sum_{-\infty}^{+\infty} J_n(m)\sin\{\omega t + np\}t \quad (6)$$

Accordingly, the light wave in the first arm is expressed by a component $J_i$, as illustrated in FIG. 18A. The orientation of an arrow that corresponds to each of the components $J_i$ indicates a phase. As an example, it is assumed that the phase of a component $J_0$ that corresponds to a carrier is zero. In this case, the phases of components $J_1$ and $J_{-1}$ are π/2, the phases of components $J_2$ and $J_{-2}$ are π, and the phases of components $J_3$ and $J_{-3}$ are 3π/2.

The light wave in the second arm is expressed by a component $K_i$, as illustrated in FIG. 18B. The orientation of an arrow that corresponds to each of the components $K_i$ indicates a phase. Here, it is assumed that the phase of a component $J_0$ is zero. In this case, the phase of a component $K_0$ is π/2, the phase of a component $K_1$ is π/2, and the phase of a component $K_{-1}$ is 3π/2. The phases of the other components are as illustrated in FIG. 18B.

The mach-zehnder modulator 61 combines the light wave in the first arm and the light wave in the second arm so as to generate a modulated optical signal. Accordingly, the modulated optical signal that is output from the mach-zehnder modulator 61 is expressed by a component J and a component K illustrated in FIG. 18C. Here, the phase of the component $J_{-1}$ generated in the first arm and the phase of the component $K_{-1}$ generated in the second arm are inverted from each other. Accordingly, the component $J_{-1}$ and the component $K_{-1}$ are cancelled. Consequently, a component that corresponds to "−1" is suppressed, and an SSB modulated optical signal is obtained, similarly to the case illustrated in FIG. 15B.

As described above, in the third embodiment, a modulated optical signal in which total harmonics distortion is suppressed is generated by controlling the phase of the mach-zehnder modulator 61. Here, the phase of the mach-zehnder modulator 61 is controlled by the bias voltage $V_D$.

The estimation system according to the third embodiment can estimate characteristics of the optical receiver 4 according to the flowchart illustrated in FIG. 10 or FIG. 12. However, a method for generating a modulated optical signal is slightly different between the first embodiment and the third embodiment. In addition, the process of S4 is not performed in the third embodiment.

As an example, in a case in which the flowchart illustrated in FIG. 10 is performed, the controller 40 and the bias control circuit 62 control the bias voltage $V_D$ of the mach-zehnder modulator 61 according to the optical spectrum detected by the optical spectrum analyzer 41, instead of the process of S7. Specifically, the controller 40 and the bias control circuit 62 control the bias voltage $V_D$ in such a way that one of an upper-sideband modulation component and a lower-sideband modulation component of the modulated optical signal that is output from the light source device 60 is suppressed. Bias control is repeatedly performed until one of the upper-sideband modulation component and the lower-sideband modulation component is sufficiently suppressed.

In a case in which the flowchart illustrated in FIG. 12 is performed, the controller 40 and the bias control circuit 62 control the bias voltage $V_D$ of the mach-zehnder modulator 61 according to the RF spectrum detected by the RF spectrum analyzer 43, instead of the process of S23. Specifically, the controller 40 and the bias control circuit 62 controls the bias voltage $V_D$ in such a way that a harmonics component having a second-order harmonics component of the oscillation signal is suppressed. Bias control is repeatedly performed until the second order harmonics component of the oscillation signal is sufficiently suppressed.

Further, when the flowchart illustrated in FIG. 10 or FIG. 12 is performed, the level adjustment circuit 51 controls the amplitude of the oscillation signal in such a way that an OMI of the modulated optical signal approaches a target value, in accordance with the monitoring result of the OMI monitor 44 in S10. The 90-degree hybrid circuit 51a generates a drive signal RFA and a drive signal RFB from the oscillation signal in which the amplitude is adjusted, and gives the drive signals to the mach-zehnder modulator 61.

As described above, in the third embodiment, a bias of the mach-zehnder modulator 61 is controlled according to an optical spectrum of a modulated optical signal or an RF spectrum of an electric signal obtained by performing optical-to-electrical conversion on the modulated optical signal such that total harmonics distortion of the modulated optical signal is suppressed. Namely, also in a configuration according to the third embodiment, a modulated optical signal that is suitable to estimate characteristics (in particular, total harmonics distortion) of an optical receiver is generated.

In addition, in the third embodiment, an SSB modulated optical signal is generated by using a mach-zehnder modulator. Therefore, even when the frequency of an oscillation signal is lower than 1 GHz, a harmonics component of the oscillation signal can be sufficiently suppressed. Accordingly, the estimation system according to the third embodiment can accurately estimate total harmonics distortion of an optical receiver even in frequency range near a DC.

Experimental Example

FIG. 19 illustrates an estimation system in an experimental example. In FIG. 19, a light source device 71 corresponds to the light source device 30 according to the first embodiment, the light source device 50 according to the second embodiment, or the light source device 60 according to the third embodiment. A monitor system 72 corresponds to the optical spectrum analyzer 41, the linear photo detector 42, the RF spectrum analyzer 43, and the OMI monitor 44. The light source device 71 generates a modulated optical signal in which total harmonics distortion is suppressed according to the flowchart illustrated in FIG. 10 or FIG. 12. In addition, in the experimental example, the frequency of an oscillation signal is swept within a range of 3 GHz to 20 GHz.

Figure 20:
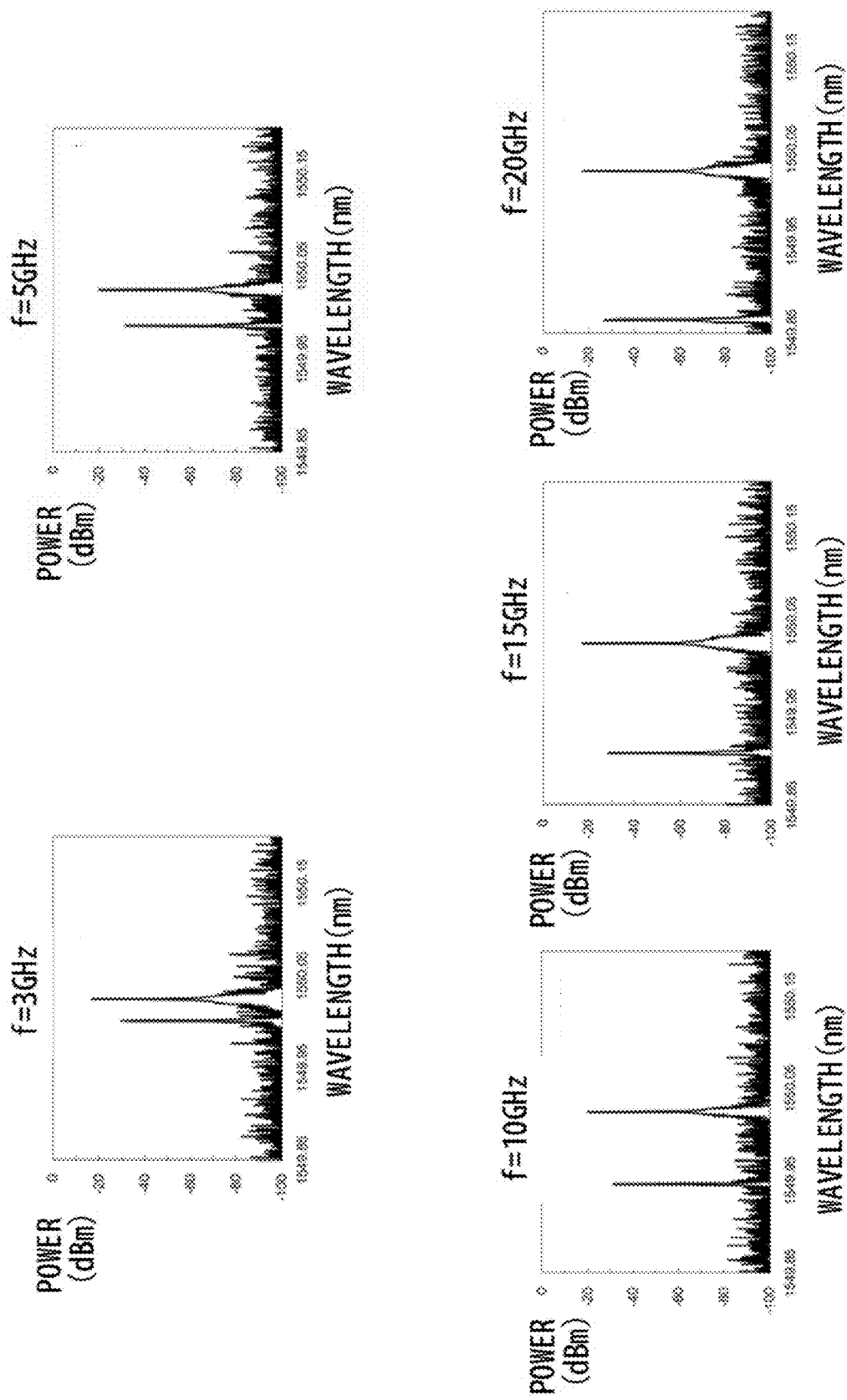
FIG. 20 illustrates a characteristic (an optical spectrum) of a light source.

FIG. 20 illustrates an optical spectrum of the modulated optical signal generated by the light source device 71. The optical spectrum is observed by the monitor system 72 (the optical spectrum analyzer 41). In this experimental example, a modulation component on a long wavelength side with respect to carrier light is suppressed. Namely, a lower-sideband modulation component of the modulated optical signal is suppressed.

Figure 21:
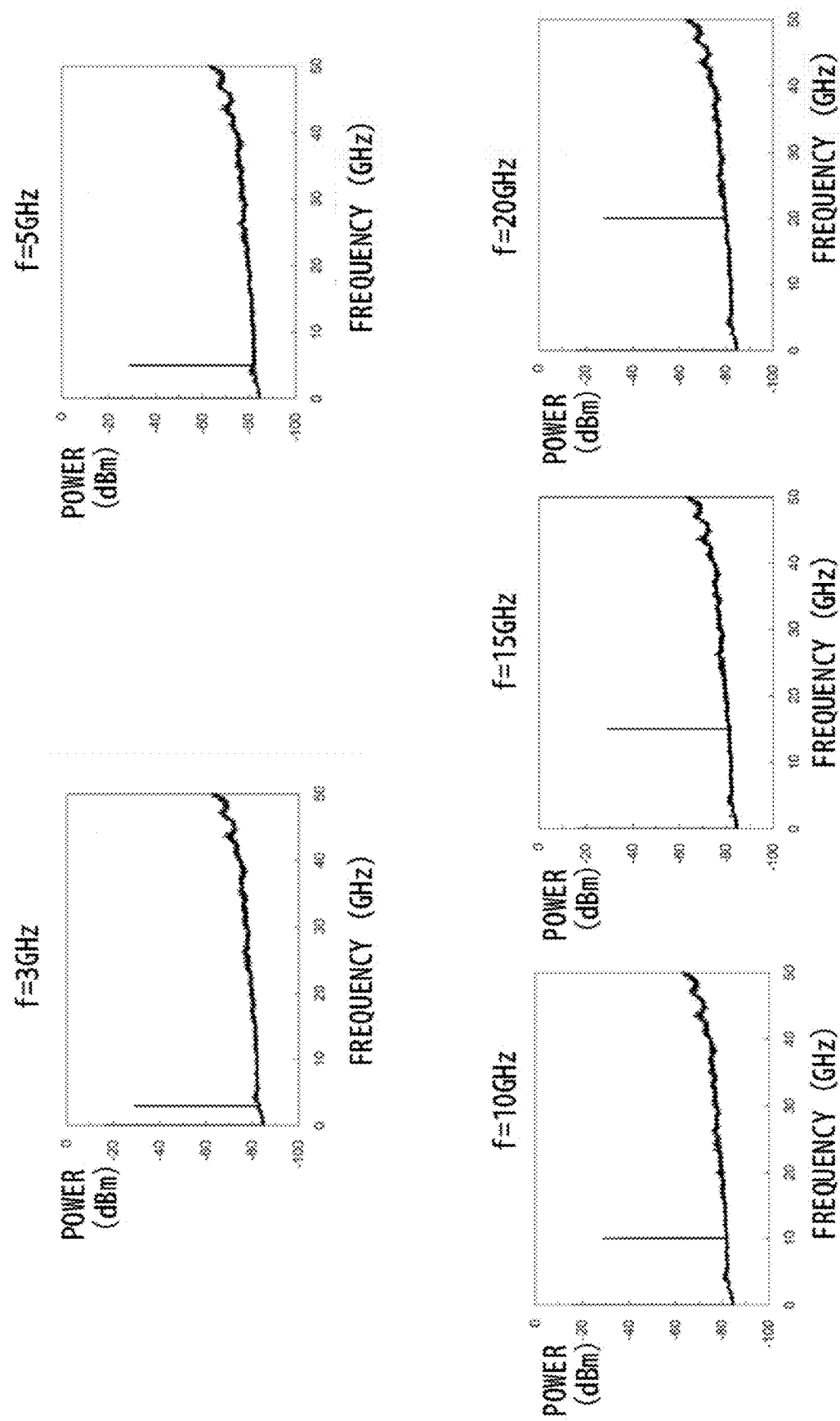
FIG. 21 illustrates a characteristic (an RF spectrum) of a light source.

FIG. 21 illustrates an RF spectrum of an electric signal obtained by performing optical-to-electrical conversion on the modulated optical signal generated by the light source device 71. The RF spectrum is observed by the monitor system 72 (the linear photo detector 42 and the RF spectrum analyzer 43). In this experimental example, the lower-sideband modulation component of the modulated optical signal is suppressed, and a harmonics component of an oscillation signal is suppressed. Consequently, a modulated optical signal having a sufficiently small total harmonics distortion is generated. In this experimental example, the total harmonics distortion of the modulated optical signal is smaller than 0.3 percent.

FIG. 22 illustrates a time waveform of the modulated optical signal generated by the light source device 71. This time waveform is observed by the monitor system 72 (the OMI monitor 44). The OMI monitor 44 is implemented by an oscilloscope.

FIG. 23 illustrates frequency dependency of total harmonics distortion of the optical receiver 4. In this experimental example, the modulated optical signal illustrated in FIGS. 20-22 is input to the optical receiver 4. The power of the modulated optical signal that is input to the optical receiver 4 is −1 dBm. The RF spectrum analyzer 45 monitors an output signal of the optical receiver 4 so as to calculate total harmonics distortion. The total harmonics distortion of the modulated optical signal is sufficiently small. Accordingly, by employing the estimation system illustrated in FIG. 19, an accurate estimation result of the total harmonics distortion of the optical receiver 4 is expected.

Fourth Embodiment

FIG. 24 illustrates an example of an estimation system according to a fourth embodiment of the invention. The estimation system according to the fourth embodiment can measure 3rd-order inter-modulation distortion (IM3) in addition to the measurement of harmonics of an optical receiver.

3rd-order inter-modulation distortion may be generated when a modulated optical signal is generated based on a plurality of signals having different frequencies from each other. Accordingly, a light source device 80 according to the fourth embodiment includes oscillators 81 and 82, a combiner 83, a level adjustment circuit 84, an SSB light source 85, and a control circuit 86.

The oscillators 81 and 82 generate oscillation signals having different frequencies from each other. In FIG. 24, the oscillation frequencies of the oscillators 81 and 82 are $f_1$ and $f_2$, respectively. In addition, the oscillation frequencies of the oscillators 81 and 82 are controlled by a frequency control signal. However, as an example, a frequency difference between the two oscillation signals is fixed. In this case, the frequency difference between the two oscillation signals may be, for example, a frequency spacing or an integral multiple of the frequency spacing of a subcarrier of an optical DMT signal. The combiner 83 combines the oscillation signals generated by the oscillators 81 and 82. The level adjustment circuit 84 adjusts the amplitude of the combined signal that is output from the combiner 83 in accordance with an OMI of the modulated optical signal, similarly to the first to third embodiments.

The SSB light source 85 generates an SSB optical signal (namely, a modulated optical signal in which one of an upper-sideband modulation component and a lower-sideband modulation component is suppressed). Accordingly, the SSB light source 85 is implemented, for example, by the E/O converter 33 and the optical filter 34 according to the first embodiment that are illustrated in FIG. 8. The SSB light source 85 may be implemented by the light source 52 and the I/Q modulator 53 according to the second embodiment that are illustrated in FIG. 13. Alternatively, the SSB light source 85 may be implemented by the light source 52 and the mach-zehnder modulator 61 according to the third embodiment that are illustrated in FIG. 16. The control circuit 86 controls the SSB light source 85 according to an optical spectrum of the modulated optical signal or an RF spectrum of an electric signal obtained by performing optical-to-electrical conversion on the modulated optical signal. Accordingly, the control circuit 86 is implemented by the filter controller 35 according to the first embodiment, the bias control circuit 54 according to the second embodiment, or the bias control circuit 62 according to the third embodiment.

In the estimation system having the configuration above, the oscillators 81 and 82 generate oscillation signals ($f_1$ and $f_2$). The SSB light source 85 generates a modulated optical signal based on a combined signal of these oscillation signals. The modulated optical signal is input to the optical receiver 4. An output signal of the optical receiver 4 is monitored by using the RF spectrum analyzer 45 and 3rd-order inter-modulation distortion of the optical receiver 4 is estimated. The 3rd-order inter-modulation distortion (IM3) is generated on both sides of the oscillation signal in the RF spectrum, as illustrated in FIG. 24.

When total harmonics distortion of the modulated optical signal is large, it is difficult to accurately estimate the 3rd-order inter-modulation distortion of the optical receiver 4. Accordingly, the light source device 80 suppresses one of an upper-sideband modulation component and a lower-sideband modulation component of the modulated optical signal, similarly to the first to third embodiments. Stated another way, an optical spectrum of a modulated optical signal generated based on a plurality of oscillation signals ($f_1$ and $f_2$) has a modulation component that corresponds to each of the oscillation signals, as illustrated in FIG. 25A. The SSB light source 85 suppresses one of an upper-sideband modulation component and a lower-sideband modulation component of the modulated optical signal. In the example illustrated in FIG. 25B, the upper-sideband modulation component is suppressed by using an optical filter.

As described above, in the fourth embodiment, a light source device that generates a modulated optical signal based on a plurality of oscillation signals having different frequencies from each other suppresses one of an upper-sideband modulation component and a lower-sideband modulation component of the modulated optical signal. Accordingly, an estimation system can accurately estimate 3rd-order inter-modulation distortion of an optical receiver by using this modulated optical signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A method for estimating characteristics of an optical receiver, the method comprising:
   generating a modulated optical signal based on an oscillation signal;
   monitoring an optical spectrum of the modulated optical signal or a spectrum of an electric signal obtained by performing optical-to-electrical conversion on the modulated optical signal;
   suppressing a modulation component of an upper sideband or a lower sideband of the modulated optical signal based on the optical spectrum of the modulated optical signal or the spectrum of the electric signal;
   controlling an amplitude of the oscillation signal in such a way that an optical modulation index approaches a specified target value, the optical modulation index indicating a ratio of an average power and a modulation amplitude of the modulated optical signal in which the modulation component is suppressed;
   guiding the modulated optical signal in which the modulation component is suppressed to the optical receiver; and
   estimating the characteristics of the optical receiver based on an output signal of the optical receiver.

2. The method according to claim 1, wherein
   when the optical spectrum of the modulated optical signal is monitored, the suppressing of the modulation component includes an operation of processing the modulated optical signal so as to reduce the modulation component of the upper sideband or the lower sideband of the modulated optical signal in the optical spectrum of the modulated optical signal.

3. The method according to claim 1, wherein
   when the spectrum of the electric signal is monitored, the suppressing of the modulation component includes an operation of processing the modulated optical signal so as to reduce a harmonics component of the oscillation signal in the spectrum of the electric signal.

4. The method according to claim 1, wherein
   the suppressing of the modulation component includes an operation of controlling a center frequency of an optical filter that filters the modulated optical signal.

5. The method according to claim 1 wherein
the generating of the modulated optical signal includes an operation of modulating continuous wave light based on the oscillation signal by using an optical modulator, and
the suppressing of the modulation component includes an operation of controlling a bias voltage of the optical modulator.

6. The method according to claim 5, wherein
the optical modulator is an I/Q modulator that includes a first mach-zehnder modulator and a second mach-zehnder modulator that are implemented in parallel,
a first oscillation signal and a second oscillation signal that are generated from the oscillation signal are respectively given to the first mach-zehnder modulator and the second mach-zehnder modulator, the first oscillation signal and the second oscillation signal having a same frequency, phases of the first oscillation signal and the second oscillation signal being shifted by 90 degrees from each other, and
the suppressing of the modulation component includes an operation of controlling a bias voltage of the first mach-zehnder modulator, an operation of controlling a bias voltage of the second mach-zehnder modulator, and an operation of controlling a bias voltage for adjusting a phase difference between the first mach-zehnder modulator and the second mach-zehnder modulator.

7. The method according to claim 5, wherein
the optical modulator is a mach-zehnder modulator,
a first oscillation signal and a second oscillation signal that are generated from the oscillation signal are respectively given to a first arm and a second arm of the mach-zehnder modulator, the first oscillation signal and the second oscillation signal having a same frequency, phases of the first oscillation signal and the second oscillation signal being shifted by 90 degrees from each other, and
the suppressing of the modulation component includes an operation of controlling a bias voltage of the mach-zehnder modulator.

8. A light source device comprising:
an oscillator;
a modulated optical signal generation circuit configured to generate a modulated optical signal based on an oscillation signal that is output from the oscillator;
an optical spectrum shaper configured to suppress a modulation component of an upper sideband or a lower sideband of the modulated optical signal based on an optical spectrum of the modulated optical signal or a spectrum of an electric signal obtained by performing optical-to-electrical conversion on the modulated optical signal; and
a level adjustment circuit configured to adjust an amplitude of the oscillation signal in such a way that an optical modulation index approaches a specified target value, the optical modulation index indicating a ratio of an average power and a modulation amplitude of the modulated optical signal in which the modulation component is suppressed.

* * * * *